United States Patent
Matsumura et al.

(10) Patent No.: US 10,980,009 B2
(45) Date of Patent: Apr. 13, 2021

(54) USER TERMINAL AND RADIO COMMUNICATION METHOD

(71) Applicant: NTT DOCOMO, INC., Tokyo (JP)

(72) Inventors: Yuki Matsumura, Tokyo (JP); Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/346,340

(22) PCT Filed: Nov. 1, 2017

(86) PCT No.: PCT/JP2017/039626
§ 371 (c)(1),
(2) Date: Apr. 30, 2019

(87) PCT Pub. No.: WO2018/084211
PCT Pub. Date: May 11, 2018

(65) Prior Publication Data
US 2019/0268898 A1 Aug. 29, 2019

(30) Foreign Application Priority Data

Nov. 2, 2016 (JP) .............................. JP2016-215668

(51) Int. Cl.
*H04W 72/04* (2009.01)
*H04L 5/00* (2006.01)
*H04W 72/02* (2009.01)

(52) U.S. Cl.
CPC ....... *H04W 72/0413* (2013.01); *H04L 5/0037* (2013.01); *H04W 72/02* (2013.01); *H04W 72/04* (2013.01); *H04L 5/0055* (2013.01)

(58) Field of Classification Search
None
See application file for complete search history.

(56) References Cited

U.S. PATENT DOCUMENTS

2009/0247174 A1* 10/2009 Zhang ................... H04L 5/0091
455/450
2013/0273924 A1* 10/2013 Hakola ................. H04W 76/14
455/450

(Continued)

OTHER PUBLICATIONS

International Search Report issued in PCT/JP2017/039626 dated Dec. 26, 2017 (1 page).

(Continued)

*Primary Examiner* — Brian S Roberts
(74) *Attorney, Agent, or Firm* — Osha Bergman Watanabe & Burton LLP

(57) ABSTRACT

To suppress decreases in spectral usage efficiency, even in the case of not using a reference signal in demodulation of uplink control information, a user terminal according to one aspect of the present invention is characterized by having a control section that determines whether or not to use a predetermined resource in transmission based on uplink control information to notify, and a transmitting section that transmits a signal in the predetermined resource when it is determined that the predetermined resource is used in transmission, where the predetermined resource is one of a first resource that is not allocated to another user terminal and a second resource that is allocated also to another user terminal.

7 Claims, 24 Drawing Sheets

(56) References Cited

U.S. PATENT DOCUMENTS

| | | | |
|---|---|---|---|
| 2014/0105155 A1* | 4/2014 | Kim .................. | H04W 72/0413 |
| | | | 370/329 |
| 2014/0169319 A1* | 6/2014 | Yang ................. | H04W 72/0413 |
| | | | 370/329 |
| 2015/0085763 A1* | 3/2015 | Gao ..................... | H04B 7/0417 |
| | | | 370/329 |
| 2015/0359036 A1* | 12/2015 | Seo ................... | H04W 52/0206 |
| | | | 370/329 |
| 2016/0277155 A1* | 9/2016 | Nissila .................. | H04L 1/1861 |
| 2016/0295574 A1* | 10/2016 | Papasakellariou .. | H04W 52/325 |
| 2018/0139014 A1* | 5/2018 | Xiong .................. | H04L 1/1861 |
| 2019/0393992 A1* | 12/2019 | Xiong .................. | H04L 5/0055 |

OTHER PUBLICATIONS

Written Opinion of the International Searching Authority issued in PCT/JP2017/039626 dated Dec. 26, 2017 (3 pages).

LG Electronics; "Discussion on UE feedback for DL multicast/ broadcast"; 3GPP TSG RAN WG1 Meeting #85, R1-164537; Nanjing, China; May 23-27, 2016 (5 pages).

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

* cited by examiner

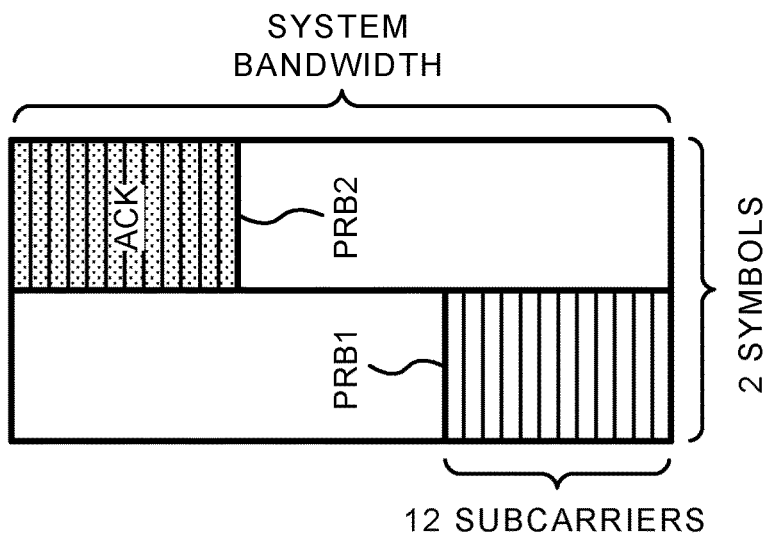
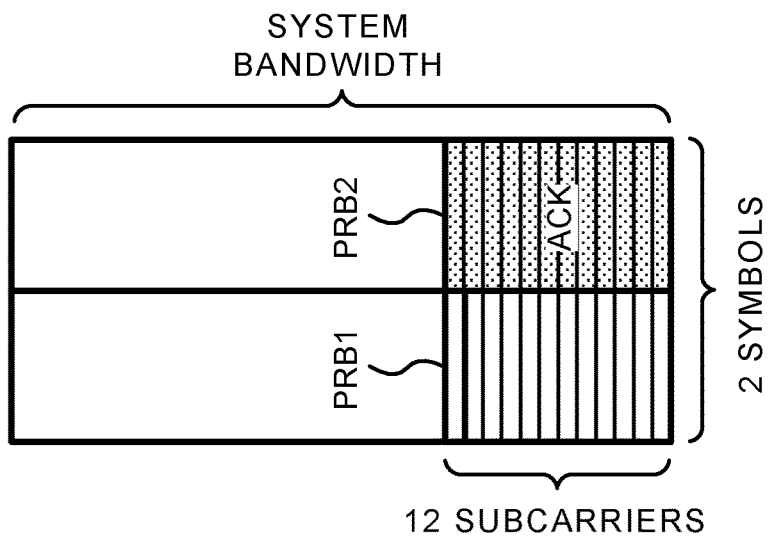
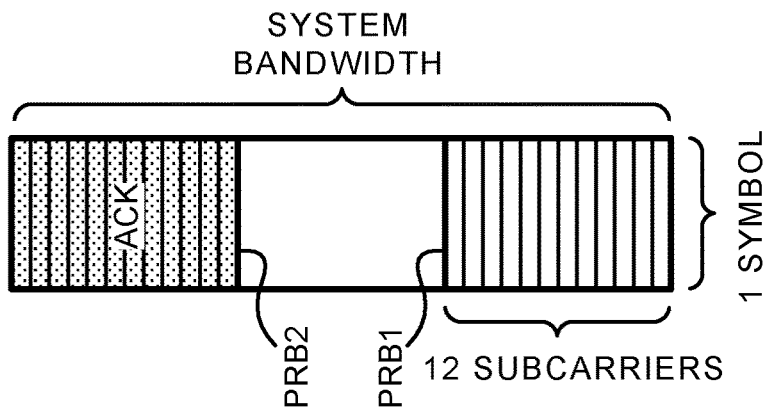

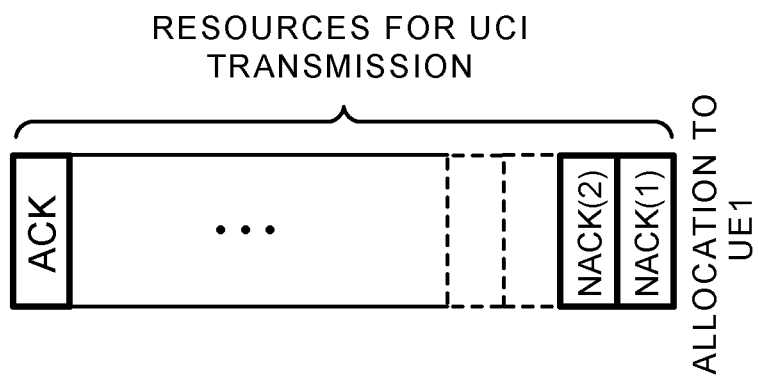
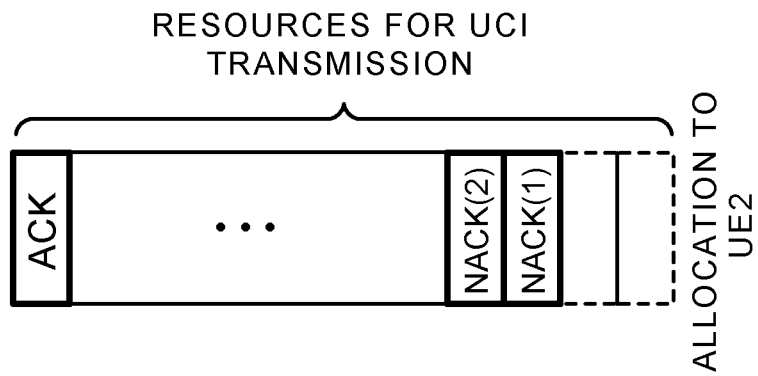
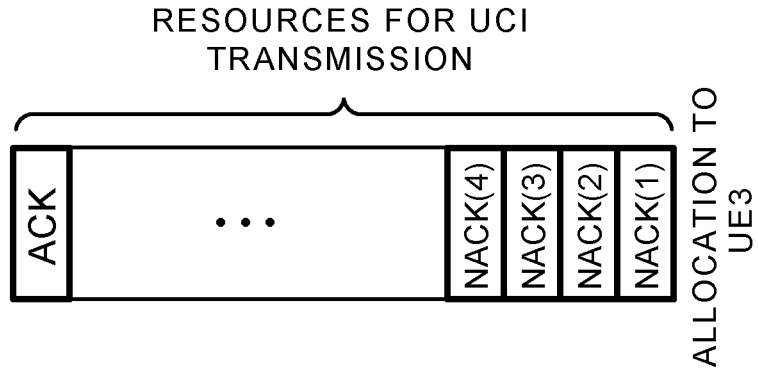

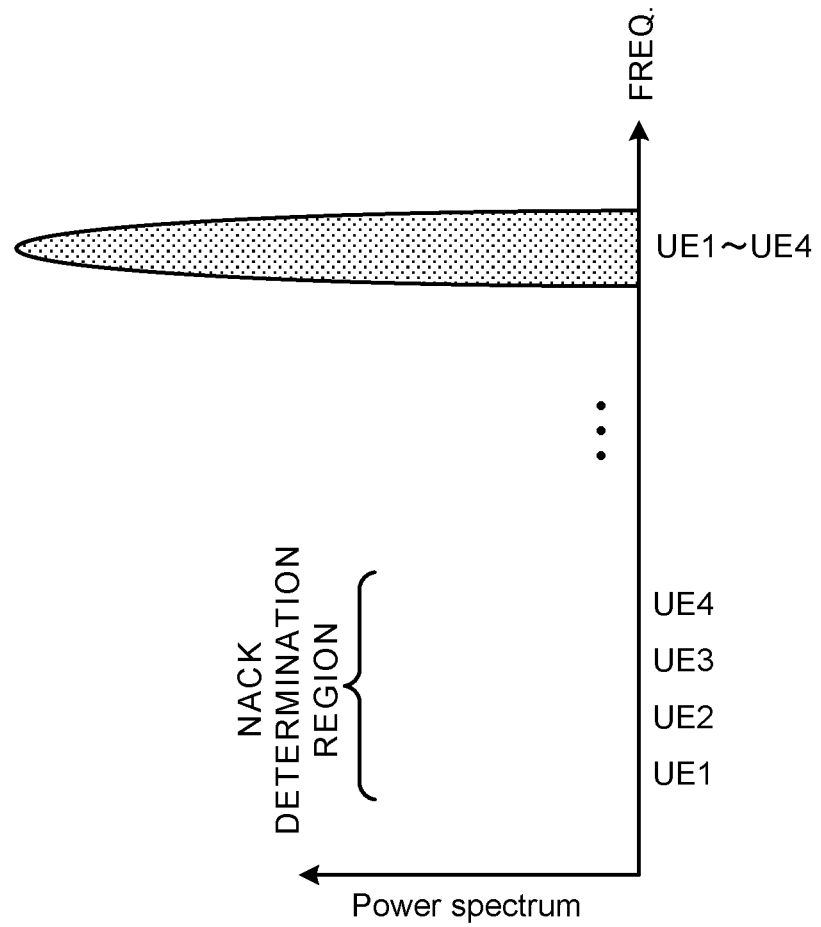
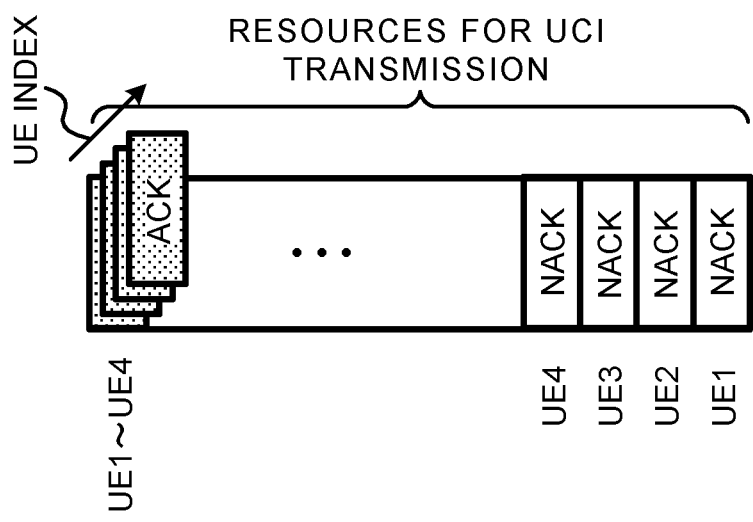

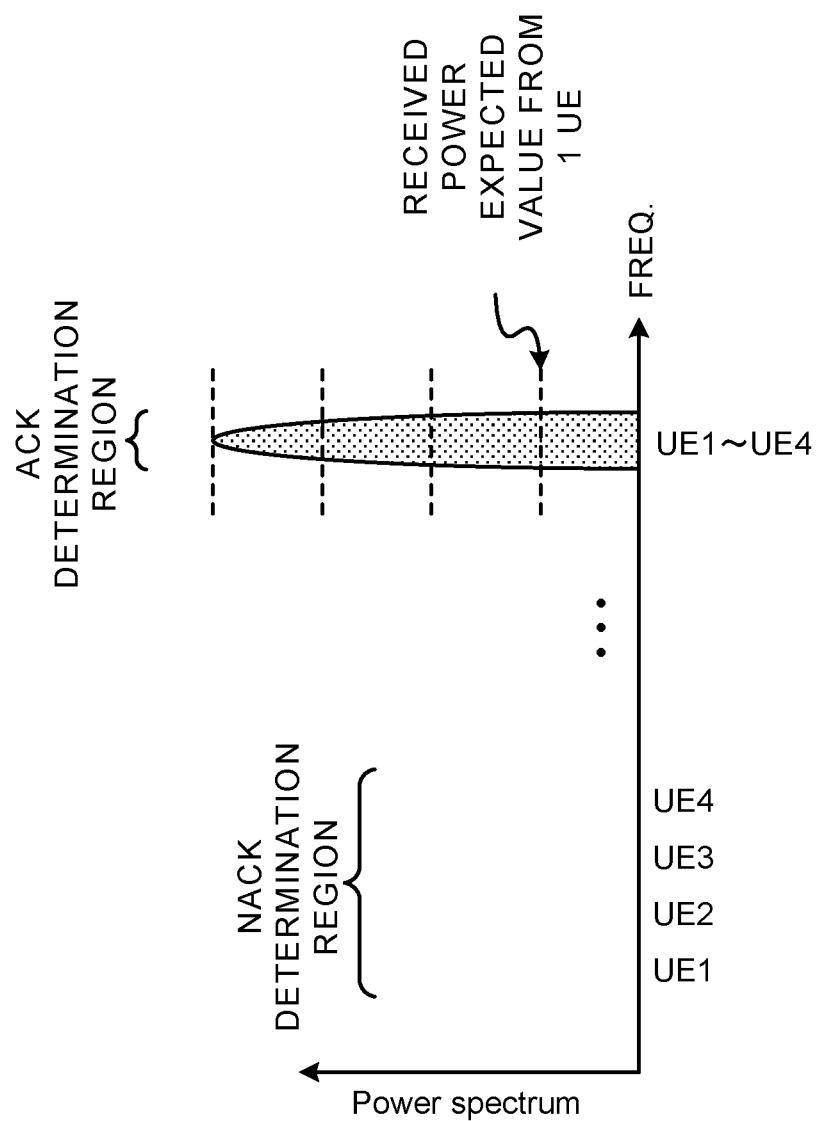
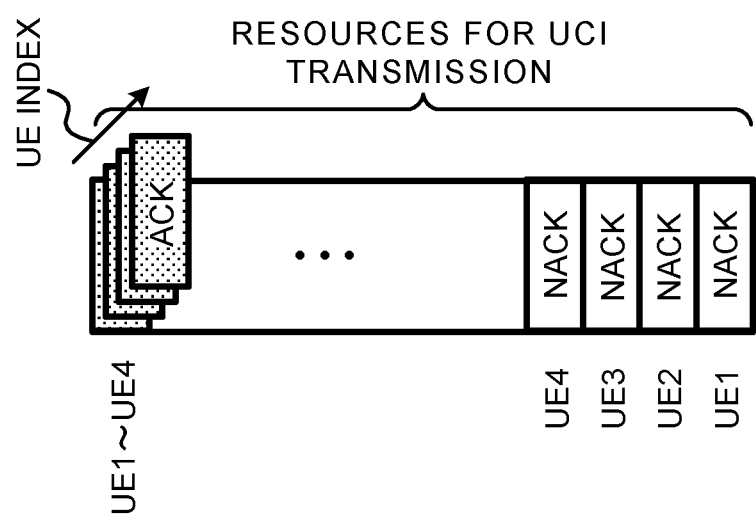
FIG. 13B
FIG. 13A

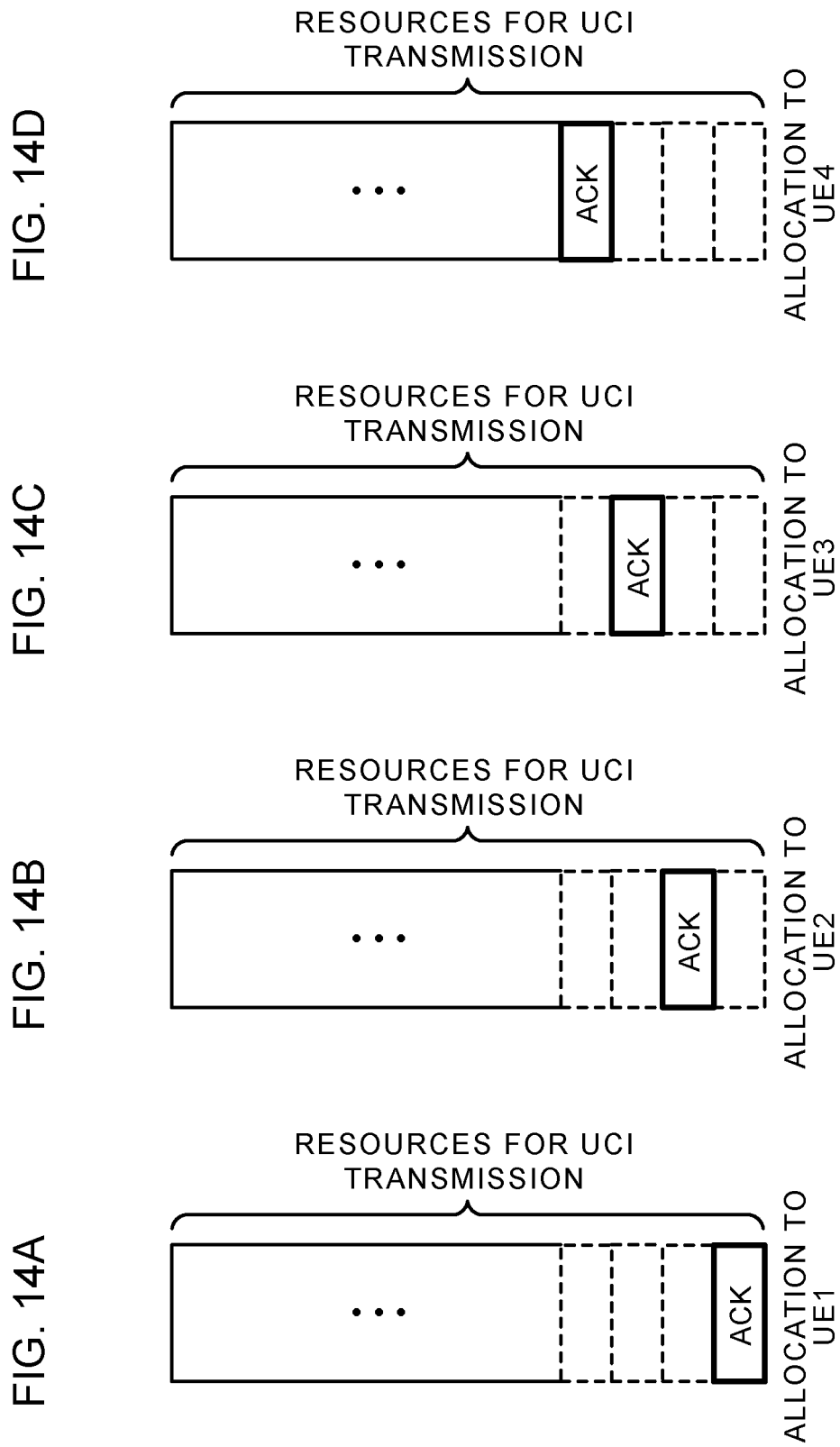

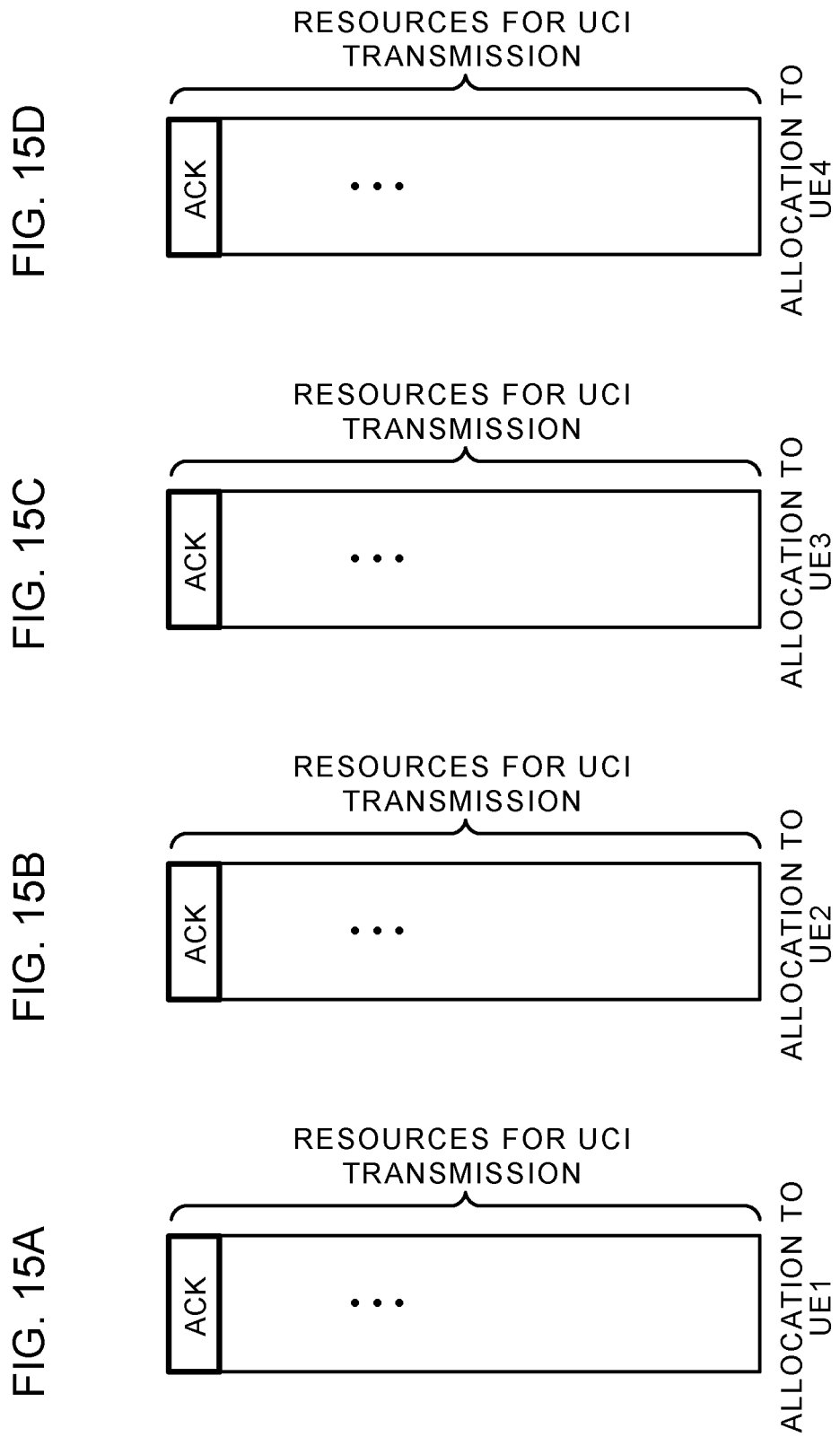

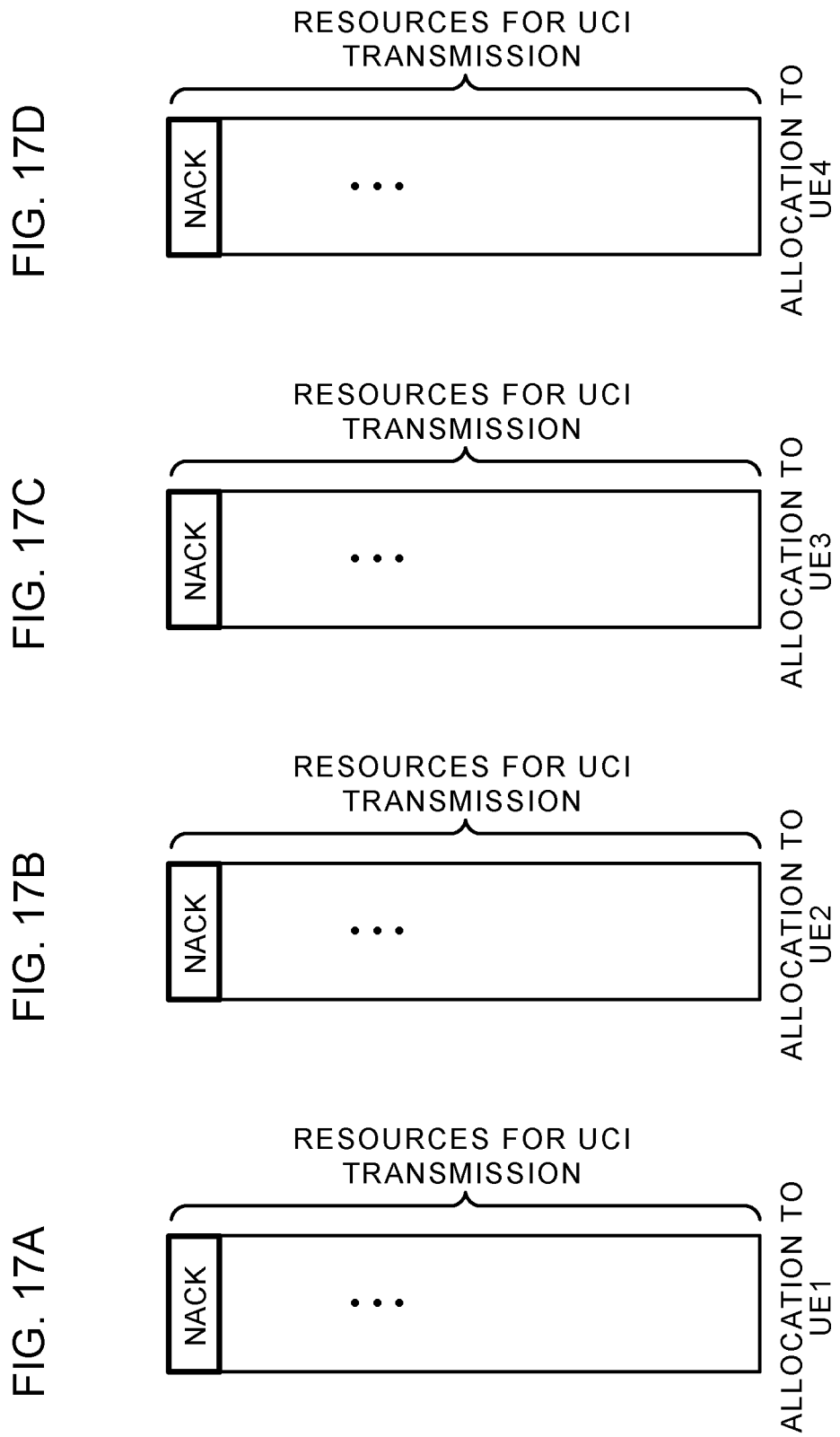

USER TERMINAL AND RADIO COMMUNICATION METHOD

TECHNICAL FIELD

The present invention relates to a user terminal and radio communication method in the next-generation mobile communication system.

BACKGROUND ART

In UMTS (Universal Mobile Telecommunications System) networks, for the purpose of higher data rates, low delay and the like, Long Term Evolution (LTE) has been specified (Non-patent Document 1). Further, for the purpose of wider bands and higher speed than LTE (also referred to as LTE Rel.8 or 9), LTE-A (LTE-Advanced, also referred to as LTE Rel.10, 11 or 12) has been specified, and successor systems (e.g., also referred to as FRA (Future Radio Access), 5G (5th generation mobile communication system), 5G+ (plus), NR (New Radio), NX (New radio access), New RAT (Radio Access Technology), FX (Future generation radio access), LTE Rel.13, 14 or 15 onward, etc.) to LTE have been studied.

In LTE Rel.10/11, in order to widen the band, introduced is Carrier Aggregation (CA) for aggregating a plurality of component carriers (CC: Component Carrier) Each CC is configured with a system band of LTE Rel.8 as one unit. Further, in CA, a plurality of CCs of the same radio base station (called eNB (eNodeB), Base Station (BS), etc.) is configured for a user terminal (UE: User Equipment).

On the other hand, in LTE Rel.12, Dual Connectivity (DC) is also introduced where a plurality of cell groups (CG: Cell Group) of different radio base stations is configured for a UE. Each cell group is comprised of at least a single cell (CC). In DC, since a plurality of CCs of different radio base stations is aggregated, DC is also called inter-base station CA (Inter-eNB CA) and the like.

Further, in LTE Rel8-12, introduced is Frequency Division Duplex (FDD) for performing downlink (DL) transmission and uplink (UL) transmission in different frequency bands, and Time Division Duplex (TDD) for switching between downlink transmission and uplink transmission temporally in the same frequency band to perform.

Furthermore, in LTE Rel.8-12, retransmission control of data is used based on HARQ (Hybrid Automatic Repeat reQuest). The UE and/or the base station receives receipt confirmation information (also referred to as HARQ-ACK, ACK/NACK, A/N, etc.) on transmitted data, and based on the information, determines retransmission of the data.

CITATION LIST

Non-Patent Document

[Non-patent Document 1] 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April, 2010

SUMMARY OF INVENTION

Technical Problem

In future radio communication systems (e.g., 5G/NR), it is expected to actualize various radio communication services so as to meet respective different requirements (e.g., ultra-high speed, high capacity, ultra-low delay, etc.).

For example, in 5G/NR, it is studied to offer radio communication services called eMBB (enhanced Mobile Broad Band), IoT (Internet of Things), mMTC (massive Machine Type Communication), M2M (Machine to Machine), URLLC (Ultra Reliable and Low Latency Communications) and the like.

In existing LTE, when a UE transmits uplink control information, it is necessary to transmit a demodulation reference signal. On the other hand, in 5G/NR, studied are uplink control information notification methods which do not use the demodulation reference signal. However, the notification method studied previously has a problem that spectral usage efficiency is low.

The present invention was made in view of such a respect, and it is an object of the invention to provide a user terminal and radio communication method capable of suppressing decreases in spectral usage efficiency, even in the case of not using a reference signal in demodulation of uplink control information.

Solution to Problem

A user terminal according to one aspect of the present invention is characterized by having a control section that determines whether or not to use a predetermined resource in transmission based on uplink control information to notify, and a transmitting section that transmits a signal in the predetermined resource, in the case of determining that the predetermined resource is used in transmission, where the predetermined resource is one of a first resource that is not allocated to another user terminal and a second resource that is allocated also to another user terminal.

Advantageous Effects of Invention

According to the present invention, it is possible to suppress decreases in spectral usage efficiency, even in the case of not using a reference signal in demodulation of uplink control information.

BRIEF DESCRIPTION OF DRAWINGS

FIGS. 3A to 3C are diagrams showing one example of problems in the UCI notification using the position of transmission PRB;

FIGS. 6A to 6C are diagrams showing another example of allocation of UCI transmission resources according to Embodiment 1;

FIGS. 8A and 8B are diagrams showing another example of UCI detection in Embodiment 1;

FIGS. 13A and 13B are diagrams showing another example of UCI detection in Embodiment 2;

FIGS. 14A to 14D are diagrams showing one example of allocation of UCI transmission resources according to Embodiment 3;

FIGS. 15A to 15D are diagrams showing one example of allocation of UCI transmission resources according to Embodiment 4;

FIGS. 17A to 17D are diagrams showing another example of allocation of UCI transmission resources according to Embodiment 4;

DESCRIPTION OF EMBODIMENTS

In 5G/NR, asynchronous HARQ is studied on DL and UL. In this case, it is preferable to support dynamic uplink control channel assignment for HARQ-ACK transmission of UL.

Further, NACK-based A/N feedback methods are studied in 5G/NR. In the method, by performing feedback only in the case of NACK, it is expected to reduce communication overhead and power consumption.

In addition, it is assumed that the NACK-based A/N feedback method has the following problems: (1) When a UE is not capable of receiving DK data, NACK is not transmitted, and the network (e.g., base station) determines that the data is correctly received; (2) since it is necessary to transmit the HARQ process number in transmitting NACK, the number of bits of uplink control information (UCI) increases, and resource usage efficiency is poor; (3) since the method is based on the assumption that a demodulation reference signal (DMRS: DeModulation Reference Signal) exists, DMRS overhead, Peak to Average Power Ratio (PAPR) and the like are high.

Figure 1A:
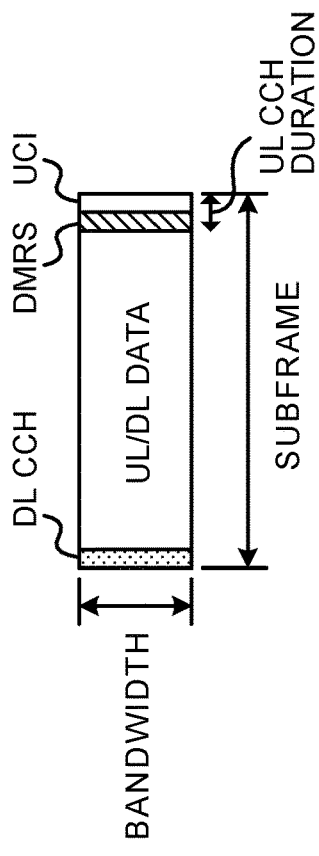
FIGS. 1A to 1D are diagrams showing one example of resource allocation in the case of multiplexing UCI with DMRS.
Figure 1B:
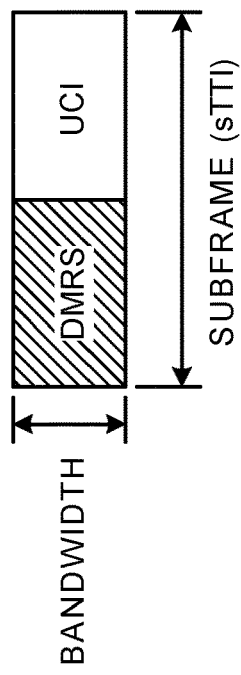

The problem of above-mentioned (3) will be described further with reference to FIG. 1. FIG. 1 contains diagrams showing one example of resource allocation in the case of multiplexing UCI with DMRS. FIGS. 1A and 1B show the example of performing Time Division Multiplexing (TDM) on the UCI and DMRS in a subframe configuration studied in 5G/NR.

In addition, the subframe configuration may be called subframe structure, subframe type, mini-subframe configuration/structure/type, frame configuration/structure/type, slot configuration/structure/type, mini-slot configuration/structure/type, subslot configuration/structure/type, transmission time interval (TTI) configuration/structure/type, and the like.

FIG. 1A shows one example of a TTI (also called reduced TTI (sTTI: shortened TTI)) having a time length shorter than the existing TTI length (=1 ms). For example, the shortened TTI is comprised of two symbols.

FIG. 1B shows one example of the subframe configuration where a downlink control channel (e.g., PDCCH (Physical Downlink Control Channel)), uplink/downlink data channel (e.g., PDSCH (Physical Downlink Shared Channel), PUSCH (Physical Uplink Shared Channel)), and uplink control channel (e.g., PUCCH (Physical Uplink Control channel)) are allocated inside one subframe. The subframe as shown in FIG. 1B may be called an NR subframe, self-contained subframe and the like.

In the case of using the NR subframe, for example, based on downlink control information (e.g., DCI (Downlink Control Information)) transmitted on the downlink control channel, a UE controls transmission/reception of uplink/downlink data channel, and transmits feedback on the data channel on the uplink control channel.

In the case of using the configurations as shown in FIGS. 1A and 1B, it is expected that the number of symbols of the PUCCH used in transmission of the UCI is lower than the number (ordinary, 14) of symbols of the PUCCH in LTE. In FIGS. 1A and 1B, the UCI and DMRS are allocated to at least two symbols, the rate of the DMRS occupied in the entire transmission signal is high, and it is argued that DMRS overhead is high.

Figure 1C:
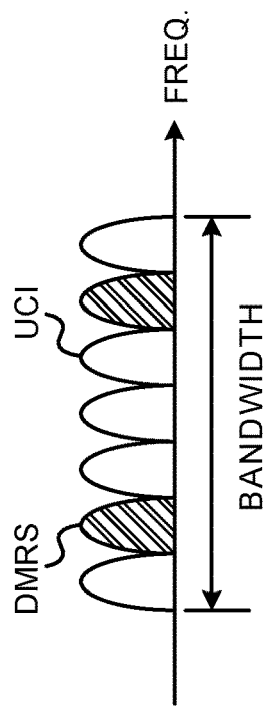
Figure 1D:
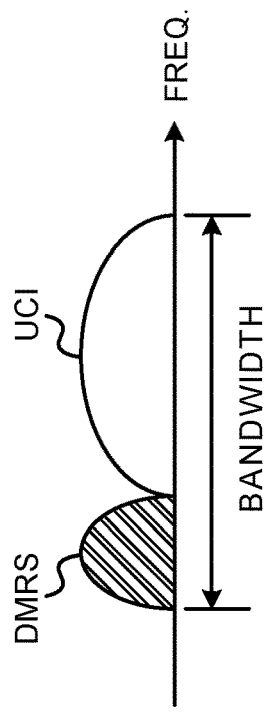

Further, in order to support PUCCH transmission of the low number of symbols, it is considered that UCI and DMRS are subjected to Frequency Division Multiplexing (FDM). FIGS. 1C and 1D show an example of performing FDM on UCI and DMRS.

FIG. 1C shows one example of single-carrier transmission (e.g., Discrete Fourier Transform Spread Orthogonal Frequency Division Multiplexing (DFT-S-OFDM)). FIG. 1D shows one example of multi-carrier transmission (e.g., Cyclic Prefix Orthogonal Frequency Division Multiplexing (CP-OFDM)).

As shown in FIG. 1C, in single-carrier transmission, in the case of performing FDM on UCI and DMRS using a plurality of different bands, three is the risk that PAPR increases. Further, as shown in FIG. 1D, in multi-carrier transmission using a plurality of subcarriers, increases in PAPR by FDM is hard to become a significant problem. However, it is expected to switch between OFDM and DFT-S-OFDM to use in 5G/NR, and therefore, in the case of using any of the schemes, it is preferable to transmit the UCI in a similar configuration, from the viewpoint of simplifying UE operation.

Therefore, UCI notification methods are studied with the need of DMRS eliminated. For example, studied is a method of notifying of UCI using a position of a transmission frequency resource (e.g., which may be also called a resource block (RB), physical resource block (PRB: Physical RB), etc.). FIG. 2 is a diagram showing one example of UCI notification using a position of the transmission PRB.

In this example, a plurality of orthogonal PRBs is allocated to a UE, and the UE notifies of ACK or NACK using the PRB position to transmit. Two PRBs (in the figure, PRB 1 and PRB 2) per bit are allocated (reserved) to the UE.

The UE transmits a predetermined signal (e.g., predetermined sequence) using one of the allocated PRBs. For example, in the case of transmitting NACK as feedback, the UE transmits using the PRB 1, and in the case of transmitting ACK as feedback, transmits using the PRB 2. Based on the PRB position in which the predetermined signal is detected, the radio base station determines which is transmitted ACK or NACK as feedback.

Figure 2C:
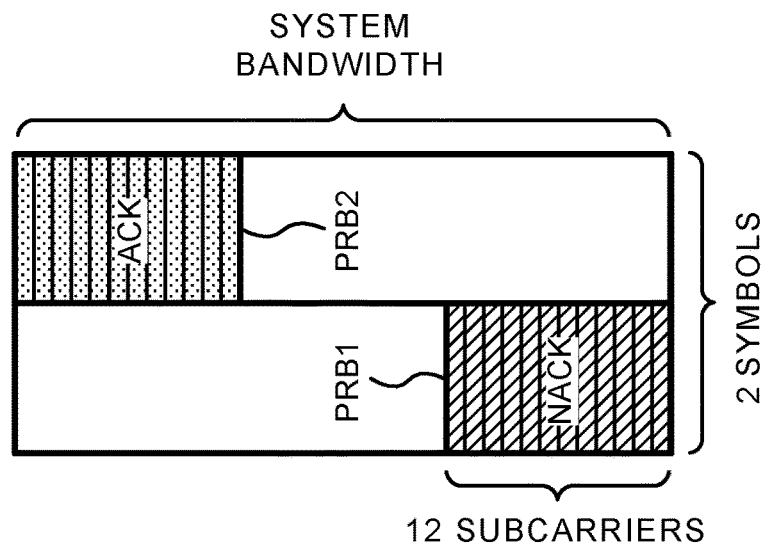
FIGS. 2A to 2C are diagrams showing one example of UCI notification using a position of transmission PRB.
Figure 2B:
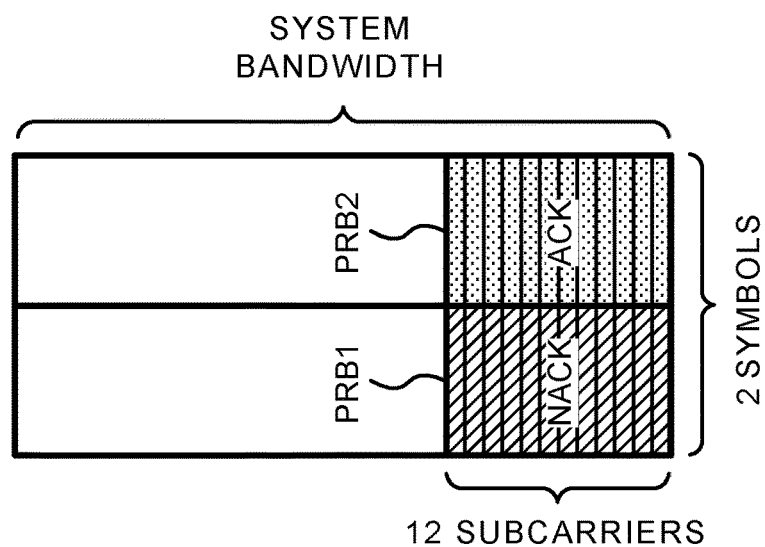
Figure 2A:
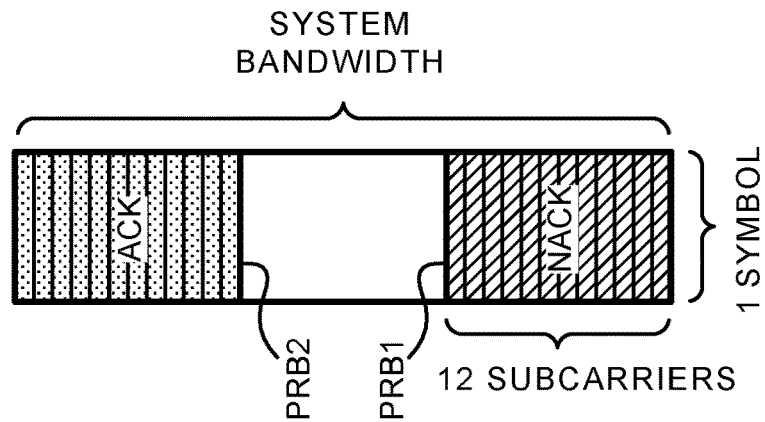

FIGS. 2A, 2B and 2C show examples where PRBs that correspond to a pair of ACK/NACK are subjected to FDM on one symbol, TDM on two symbols, and hopping on two symbols, respectively. In addition, in FIG. 2, the PRBs that correspond to ACK/NACK are allocated to the end of the system bandwidth, but the resource is not limited thereto.

Further, in FIG. 2, the radio resource region used in UCI notification is comprised of 1 PRB×1 symbol unit, but the invention is not limited thereto. In the present Description, the frequency resource for UCI notification may be comprised of not only 1 RRB but also any bandwidth, and the time resource for UCI notification may be comprised of not only 1 symbol but also any period (e.g., 1 subframe, 1 slot, 1 subslot).

However, in the UCI notification method with no need of DMRS, there is the problem that spectral usage efficiency is low due to occurrences of PRBs that are not transmitted. FIG. 3 is a diagram showing one example of the problem in the UCI notification using the position of transmission PRB. FIGS. 3A to 3C respectively correspond to cases of transmitting ACK in FIGS. 2A to 2C. In FIGS. 3A to 3C, since any signal is not transmitted in PRB 1, resources of PRB 1 are wasted (since the resources are reserved for a particular UE, another UE does not use.)

Therefore, the inventors of the present invention studied techniques to suppress decreases in spectral usage efficiency in the UCI notification method with no need of DMRS, and found out the present invention.

Embodiments according to the present invention will be described below in detail with reference to drawings. A radio communication method according to each Embodiment may be applied alone, or may be applied in combination.

In addition, the present invention is applicable to both the single-carrier transmission scheme (e.g., DFT-s-OFDM) and the multicarrier transmission scheme (e.g., CP-OFDM) as the scheme used in transmission.
(Radio Communication Method)
<Embodiment 1>

In Embodiment 1, a part of resources (may be called UCI transmission resources) to notify of UCI is overlapped and multiplexed. Other resources that do not overlap are allocated to be orthogonal.

Herein, the UCI transmission resources are essentially resources (order) capable of being configured to be orthogonal and being used in transmitting information, and may be at least one of a frequency, time, code, predetermined sequence (e.g., Zadoff-Chu sequence), different phase rotation amounts of the predetermined sequence (e.g., Zadoff-Chu sequence), spreading code, MIMO (Multi-Input Multi-Output) layer and the like.

Among the UCI transmission resources, resources which do not overlap with other UEs (which are not allocated to other UEs) may be called UE-specific resources, and resources which are capable of being overlapped/overlap with other UEs (which are also allocated to other UEs) may be called UE common resources. Hereinafter, the case where the UE common resource is one resource will be shown, but the invention is not limited thereto. For example, the UE common resource may be two resources or more.

Figure 4B:
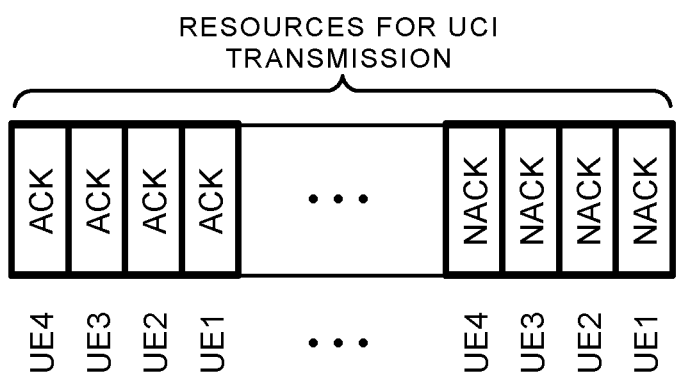
FIGS. 4A and 4B are diagrams showing one example of comparing the conventional method with a method of Embodiment 1.
Figure 4A:
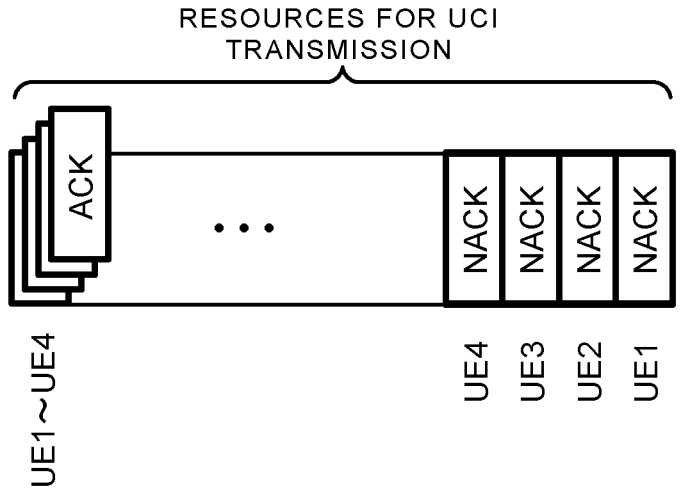
Figure 5D:
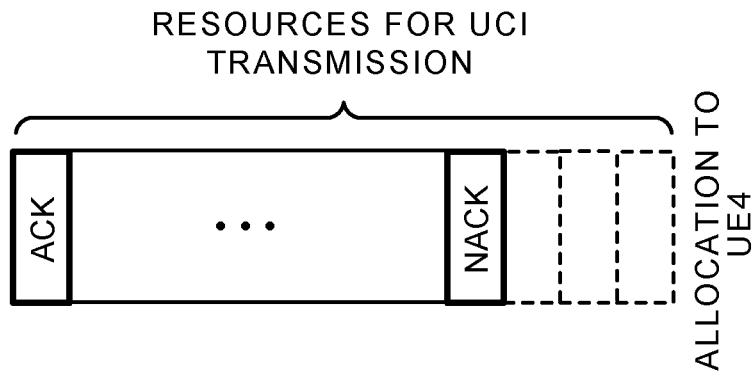
FIGS. 5A to 5D are diagrams showing one example of allocation of UCI transmission resources according to Embodiment 1.
Figure 5C:
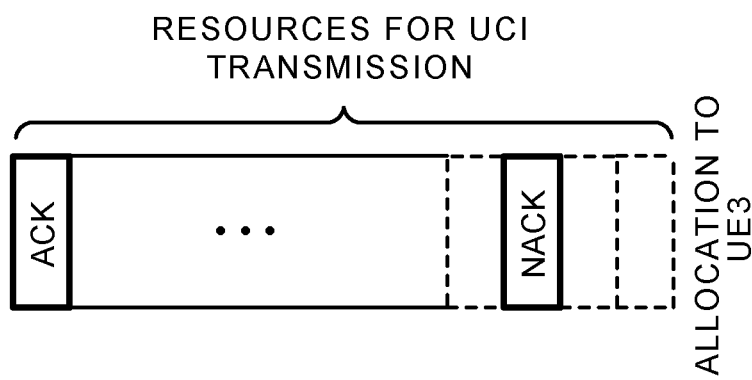
Figure 5B:
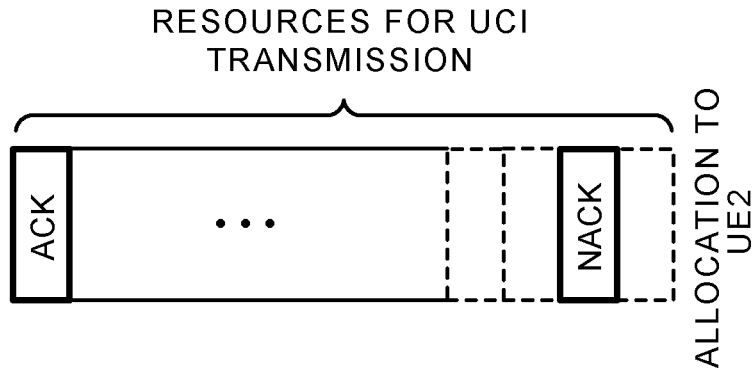
Figure 5A:
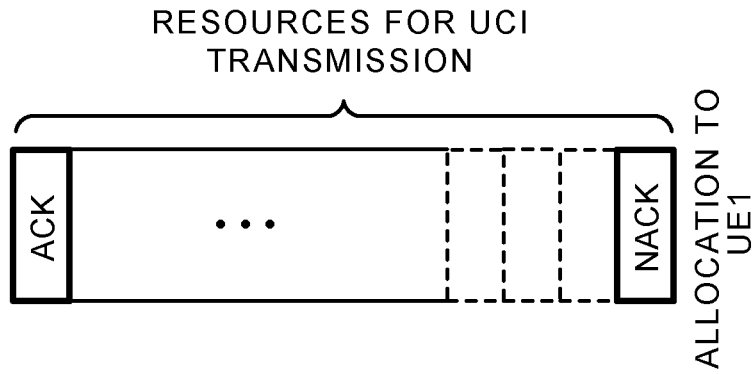

FIG. 4 contains diagrams showing one example of comparing the conventional method with the method of Embodiment 1. FIG. 4A shows one example of the conventional UCI notification method with no need of DMRS, and FIG. 4B shows one example of the UCI notification method with no need of DMRS of Embodiment 1. In any of methods, 2 PRBs are reserved for 1 UE.

In the case of FIG. 4A, since all resources to notify of UCI are transmitted not to overlap (to be orthogonal), for UCI transmission to 4 UEs (UE1 to UE4), total 8 PRBs (4 PRBs for NACK, 4 PRBs for ACK) are required. On the other hand, in the case of FIG. 4B, since ACK of each UE is multiplexed while overlapping in the same frequency and time resources (without being orthogonalized), for UCI transmission to 4 UEs (UE1 to UE4), total 5 PRBs (4 PRBs for NACK, 1 PRB for ACK) are enough. In the example of FIG. 4B, the above-mentioned "part of resources to notify of UCI" is the ACK resource.

FIG. 5 contains diagrams showing one example of allocation of UCI transmission resources according to Embodiment 1. Herein, the example is shown where information of 1 bit per UE is allocated as the UCI with no need of DMRS. Each of FIGS. 5A to 5D corresponds to allocation of UCI transmission resources to UE1 to UE4 in FIG. 4B. In addition, the vertical direction of FIG. 5 represents an axis that corresponds to one of above-mentioned resources. For example, when the UCI transmission resources are frequencies, 1 block of the resources in FIG. 5 may be a PRB, or may be a resource element (or subframe).

The UE may be configured for (notified of) information (may be called UCI transmission resource information) on the UCI transmission resources. The notification may be performed by higher layer signaling (e.g., RRC (Radio Resource Control) signaling, broadcast information (master information block (MIB), system information block (SIB), etc.), MAC (Medium Access Control) signaling), physical layer signaling (e.g., DCI) or combination thereof.

For example, in the case of notifying of UCI of 1 bit, 2 resources (1 resource for NACK, 1 resource for ACK) are allocated to 1 UE, and information on these two resources is notified to the UE as the UCI transmission resource information.

The UCI transmission resource information may include information for identifying a position, value, amount or the like of the allocated resource with respect to at least one of the above-mentioned resources, may be indicated by an absolute value, may be indicated by a relative value from predetermined reference, or may be indicated by an index associated with the position, value, amount or the like of the resource. For example, in the case where the resource is the frequency, the UCI transmission resource information may be a PRB index and the like, and in the case where the resource is time, may be a subframe index and the like.

The UCI transmission resource information may include an index indicating (type of resource) which above-mentioned resources are used in UCI notification. For example, the case where the index is "0" may indicate using "frequency", and the case where the index is "1" may indicate using "time". The correspondence relationship between the index and the position, value, amount, type or the like of the resource may be specified by specifications, or may be notified to the UE by higher layer signaling and the like.

Corresponding to (description) of the UCI to notify, the UE selects a resource from among allocated resources to transmit a signal. A sequence of the transmission signal may use the CAZAC (Constant Amplitude Zero Auto-Correlation) sequence (e.g., Zadoff-chu sequence), or may be sequences (CG-CAZAC (computed generated CAZAC) sequences) in conformity with the CAZAC sequence like given by 3GPP TS 36.211 Table 5.5.1.2-1, Table 5.5.1.2-2 and the like.

Herein, information on the phase rotation amount of the CAZAC sequence, and information on the row and/or the column of the above-mentioned Table may be notified to the UE as the UCI transmission resource information, or independently of the UCI transmission resource information.

FIG. 5 shows the example where 1 UE transmits (multiplexes) the UCI of 1 bit, but the invention is not limited thereto. For example, also in the case where 1 UE transmits UCI of a plurality of bits, a plurality of pieces of UCI to a plurality of transport blocks and the like, the similar resource allocation may be performed.

FIG. 6 contains diagrams showing another example of allocation of UCI transmission resources according to Embodiment 1. FIGS. 6A and 6B show an example of notifying of information of 2 bits per UE as UCI, and FIG. 6C shows an example of notifying of information of 4 bits per UE as UCI.

In the cases of FIGS. 6A and 6B, 3 resources (2 resources for NACK, 1 resource for ACK) are allocated to 1 UE. In the case of FIG. 6C, 5 resources (4 resources for NACK, 1 resource for ACK) are allocated to 1 UE. Similarly, it is possible to perform notification of UCI of k (>0) bits by allocating k+1 resources per UE.

Next, operation on the side of receiving the UCI will be described. Hereinafter, descriptions will be made, while assuming that the UCI reception side is a base station, but the invention is not limited thereto.

Among all transmission resources for UCI, the base station performs measurement (e.g., received power measurement) of resources (may be called NACK notification region, NACK determination region and the like) allocated for NACK, and is thereby capable of determining the UE which notifies of NACK.

Further, the base station performs measurement (e.g., received power measurement) of resources (may be called ACK notification region, ACK determination region and the like) allocated for ACK, and is thereby capable of determining that at least one UE notifies of ACK.

Assuming that all UEs with resources allocated transmit the UCI, by performing signal detection in the NACK determination region and ACK determination region, the base station determines the UCI from each UE. In addition, the words "all UEs with resources allocated", may be used to be equivalent to the words "all UEs with a part of UCI transmission resources overlapped and multiplexed", "all UEs with the same UCI transmission resources allocated" and the like.

Figure 7A:
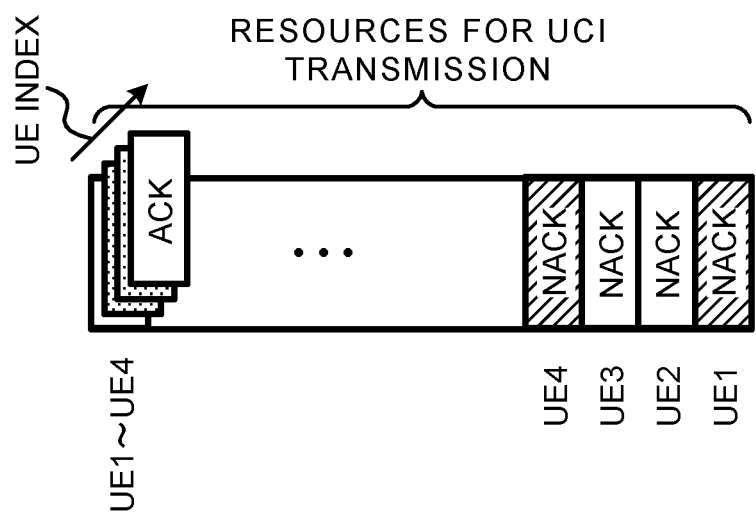
FIGS. 7A and 7B are diagrams showing one example of UCI detection in Embodiment 1.
Figure 7B:
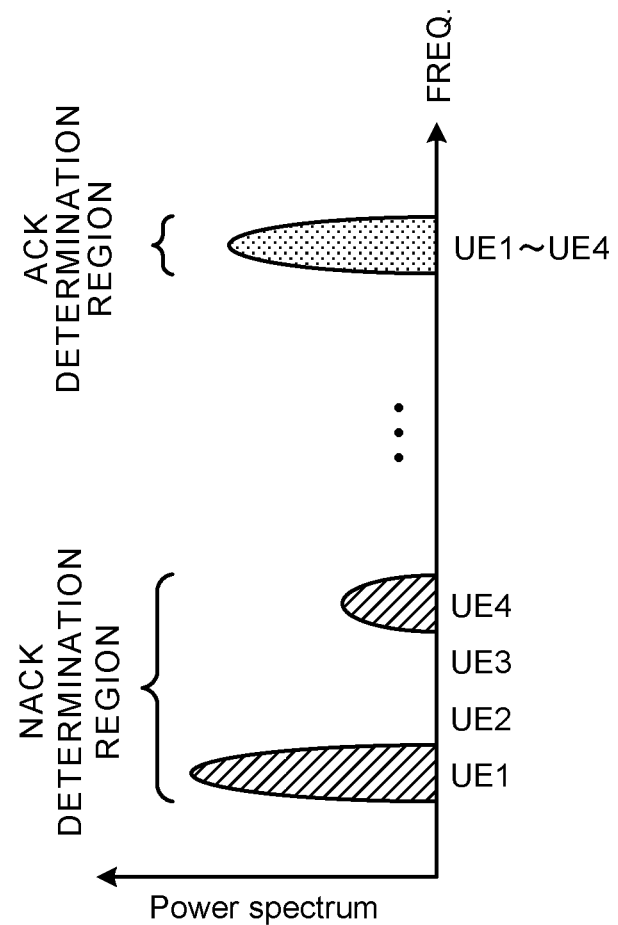

FIG. 7 contains diagrams showing one example of UCI detection in Embodiment 1. FIG. 7A illustrates resources (in which a signal sequence is transmitted) used in UCI transmission, and FIG. 7B shows a graph where the horizontal axis represents resources, and the vertical axis represents power spectrum measured in the base station. Herein, resource allocation is as in FIG. 4B, i.e. the case of allocating UCI transmission resources (two resources) of 1 bit to each of 4 UEs, and the UCI transmission resource is the frequency will be described as an example, but the invention is not limited thereto. In addition, in examples described later, unless otherwise noted, the same conditions as in FIG. 4B are assumed.

As shown in FIG. 7A, in this example, UE1 and UE4 transmit NACK, and UE2 and UE3 transmit ACK. In this case, for example, as shown in FIG. 7B, the base station observes power in resources of the UE1 and UE4 in the NACK determination region, and in resources of the ACK determination region. Since a propagation environment varies with UE, it is expected that power observed in the NACK determination region also varies.

Power observed in the ACK determination region is power of mixed signals of transmission signals of UE2 and UE3. Therefore, only from the measurement result in the ACK determination region, it is difficult for the base station to determine the UE of received ACK.

In this example, based on the measurement result in the NACK determination region, the base station determines that the UE1 and UE4 transmit NACK. Further, based on the measurement result in the ACK determination region, the base station determines that UEs (UE2 and UE3) except the UE1 and UE4 that transmit NACK transmit ACK.

FIG. 8 contains diagrams showing another example of UCI detection in Embodiment 1. As shown in FIG. 8A, in this example, all of the UE1 to UE4 transmit ACK. In this case, as shown in FIG. 8B, the base station observes power in resources of the ACK determination region, and does not observe any received signal in the NACK determination region. Based on the measurement results in the NACK determination region and ACK determination region, the base station determines that all of the UE1 to UE4 transmit ACK.

Figure 9:
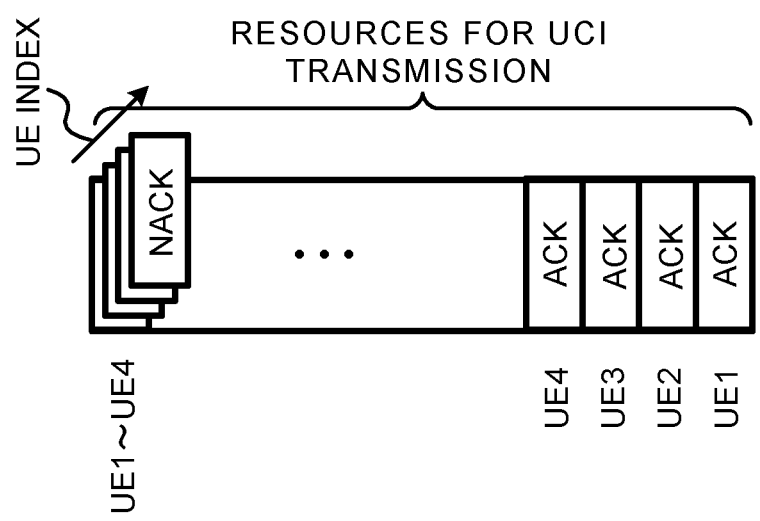
FIG. 9 is a diagram showing one example of multiplexing NACK resources in Embodiment 1.

In addition, in the foregoing, the example of overlapping and multiplexing ACK resource is shown, but the invention is not limited thereto. In the foregoing description, another Embodiment where NACK and ACK are replaced with each other is also possible. In other words, NACK resources may be overlapped and multiplexed. FIG. 9 is a diagram showing one example where NACK resources are multiplexed in Embodiment 1. FIG. 9 corresponds to allocation where NACK and ACK resources are replaced with each other in FIG. 4B.

In the case of FIG. 9, NACK of each UE is capable of being overlapped and multiplexed in the same frequency and time resources. On the other hand, ACK is transmitted in orthogonal resources. Therefore, as compared with the case of multiplexing NACK resources, it is made easy to determine the UE of received ACK.

According to Embodiment 1 as described above, even in the case of notifying of UCI by resources, since it is possible to decrease the number of reserved resources, it is possible to improve usage efficiency of resources.

<Embodiment 2>

Embodiment 2 is the same as Embodiment 1 in the respect that a part of UCI transmission resources is overlapped and multiplexed, and differs in the respect that a transmission signal is adjusted so that a received signal is a desired state on the reception side. Specifically, in Embodiment 2, a UE corrects a transmission signal of the overlapped and multiplexed UCI transmission resource to transmit so that a received signal of the resource is subjected to in-phase addition. By this means, it is possible to suppress decreases in determination accuracy of UCI.

For example, as correction of the transmission signal, precoding may be used. In this case, the UE and/or the base station may assume that at least precoding is applied to the overlapped and multiplexed UCI resource.

Figure 10A:
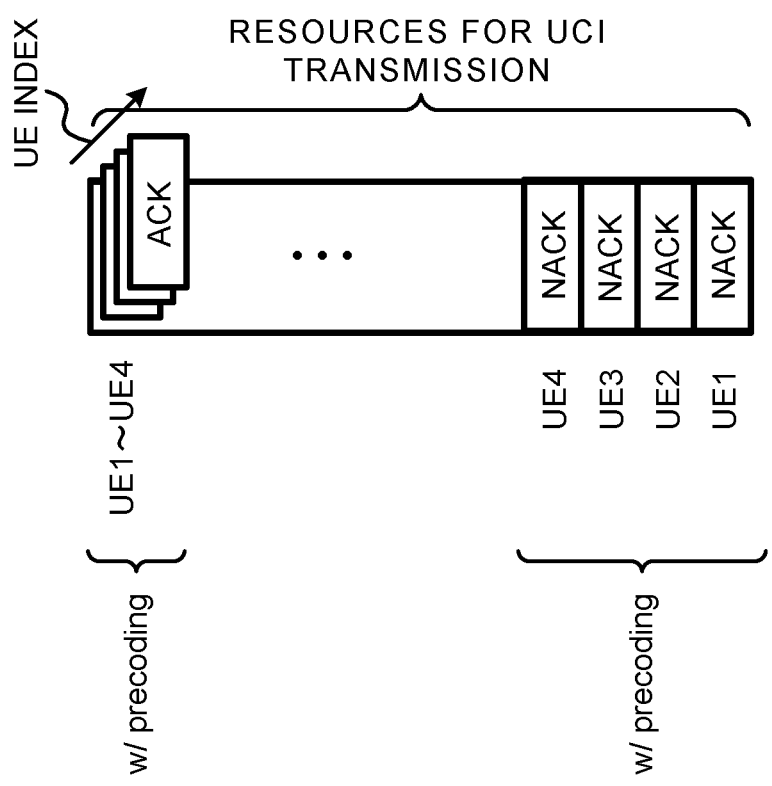
FIGS. 10A and 10B are diagrams showing one example of precoding applied to resources according to Embodiment 2.
Figure 10B:
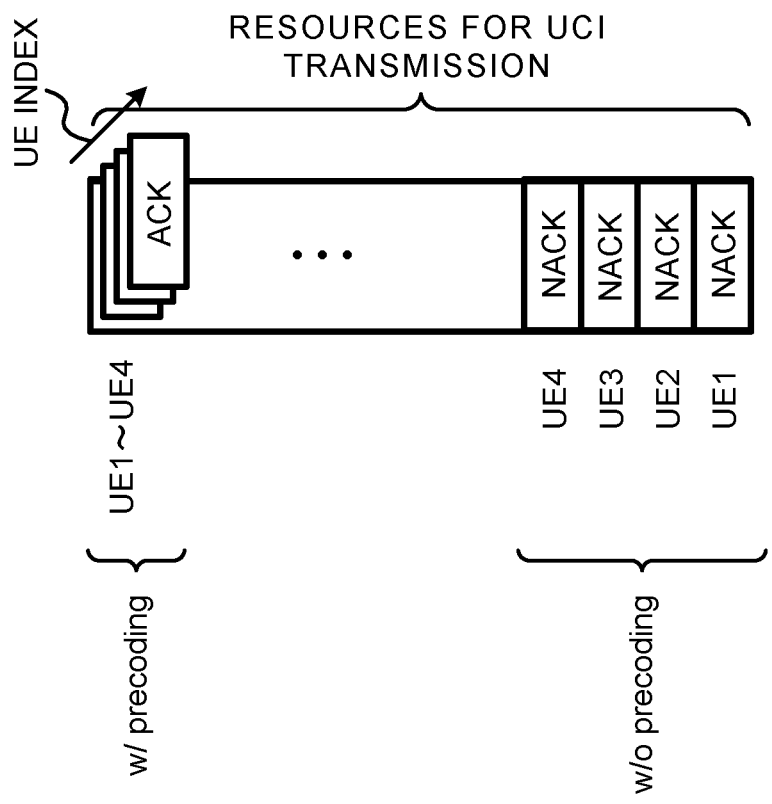

FIG. 10 contains diagrams showing one example of precoding applied to resources according to Embodiment 2. The UE may apply precoding to only the overlapped and multiplexed UCI transmission resource (FIG. 10A), or may apply precoding to all allocated UCI transmission resources (FIG. 10B). In FIG. 10A, precoding is not applied to a transmission signal of the NACK resource that is the UE-specific resource. On the other hand, in FIG. 10B, precoding is also applied to the NACK resource.

The UE may be notified of information on precoding applied to UCI transmission resources. The notification may be performed by higher layer signaling (e.g., RRC signaling), physical layer signaling (e.g., DCI) or combination thereof.

For example, precoding candidates (e.g., codebook) may be specified by specifications, or may be notified by higher layer signaling and the like, and based on a predetermined index notified by the DCI, the UE may select precoding from among the precoding candidates, and apply the selected precoding to transmit a signal in the UCI transmission resource.

In addition, in FIG. 10B, precoding applied to a part of UCI transmission resources and precoding applied to the other UCI transmission resources may be the same, or may be different from one another. For example, different precoding may be used between the ACK resource and the NACK resource, and information on respective precoding may be notified to the UE.

In addition, as correction of the transmission signal, transmit power control may be further used. In this case, the UE and/or the base station may expect that at least transmit power control is applied to the overlapped and multiplexed UCI resource.

Herein, transmit power control may be the same as power control of PUCCH in existing LTE. For example, the UE may perform transmit power control for measuring received power of a downlink control channel and/or a reference signal of a data channel from the base station (it is assumed that transmit power of the reference signal is beforehand notified), calculating path loss to the base station, and compensating for the path loss so that average received power of the base station is a target value.

Figure 11A:
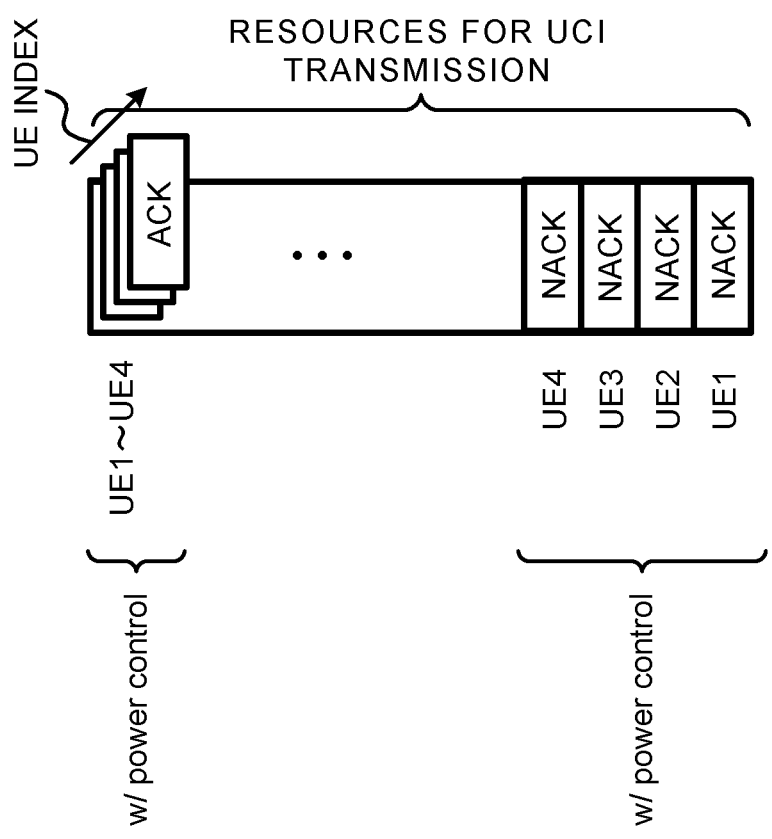
FIGS. 11A and 11B are diagrams showing one example of transmit power applied to resources according to Embodiment 2.
Figure 11B:
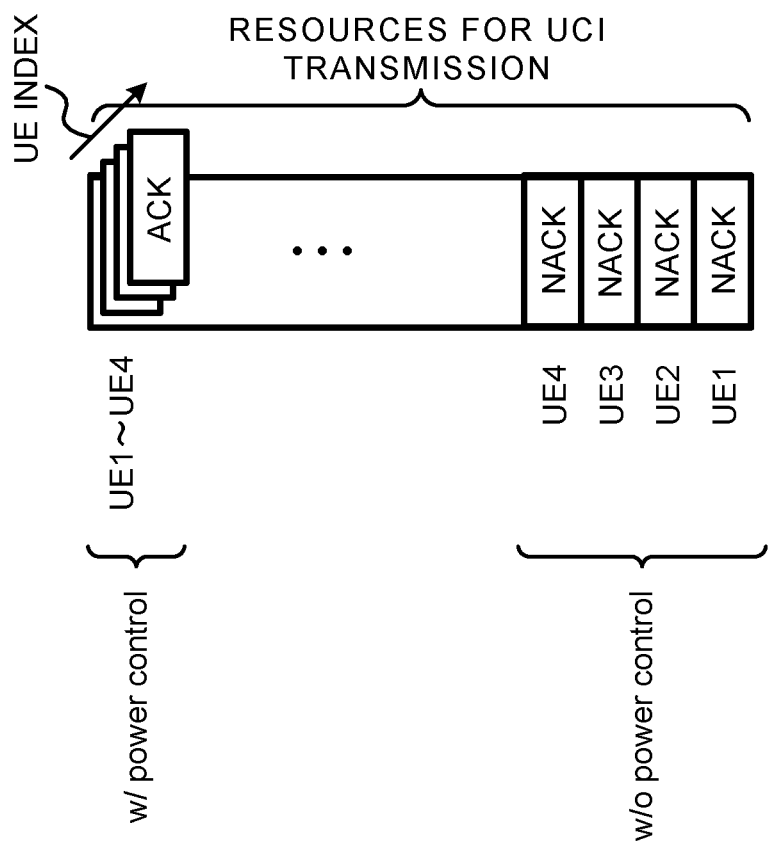

FIG. 11 contains diagrams showing one example of transmit power control applied to resources according to Embodiment 2. The UE may apply transmit power control only to the UCI transmission resource to overlap and multiplex (FIG. 11A), or may apply transmit power control to all of allocated UCI transmission resources (FIG. 11B). In FIG. 11A, transmit power control is not applied to a transmission signal of the NACK resource that is the UE-specific resource. On the other hand, in FIG. 11B, transmit power control is also applied to the NACK resource.

The UE may be notified of information on transmit power control applied to UCI transmission resources. The notification may be performed by higher layer signaling (e.g., RRC signaling), physical layer signaling (e.g., DCI) or combination thereof.

In addition, in FIG. 11B, transmit power control applied to a part of UCI transmission resources and transmit power control applied to the other UCI transmission resources may the same, or may be different from one another. For example, different transmit power control may be used between the ACK resource and the NACK resource, and information on respective transmit power control may be notified to the UE.

In addition, transmit power control may not be applied to the resource with precoding applied, or transmit power control may be applied to the resource without precoding being applied.

In the case of transmitting signals with control as shown in FIG. 10 or 11, the base station (UCI reception side) performs measurement of the NACK determination region among all transmission resources for UCI, and is thereby capable of determining which UE notifies of NACK. By applying precoding and/or transmit power control, it is expected that received signal power is stabilized.

Further, in Embodiment 2, by performing measurement (e.g., received power measurement) of the ACK determination region, the base station is capable of estimating the number of UEs that transmit ACK. For example, in the case of performing transmit power control on the ACK determination region, the base station is capable of grasping an expected value of received power per UE. Furthermore, since a plurality of pieces of UCI multiplexed in overlapped resources is subjected to in-phase combining by precoding, by ascertaining that measured received power corresponds to expected values of received power of a number of UEs, the base station is capable of estimating the number of UEs that transmit the UCI.

Figure 12A:
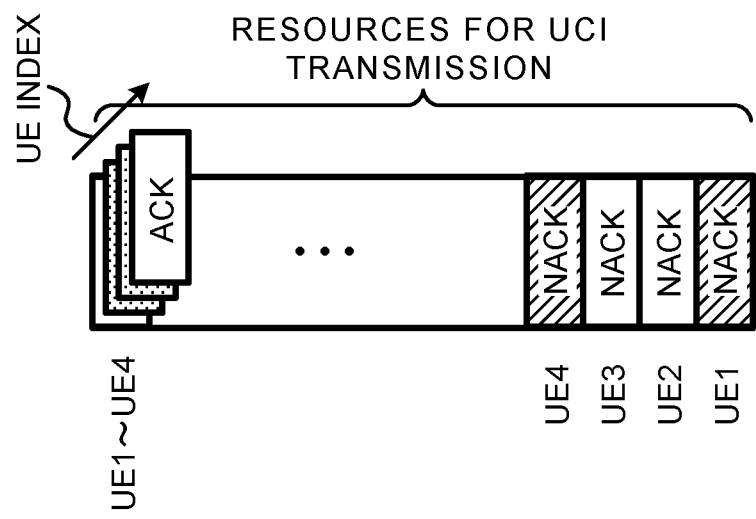
FIGS. 12A and 12B are diagrams showing one example of UCI detection in Embodiment 2.
Figure 12B:
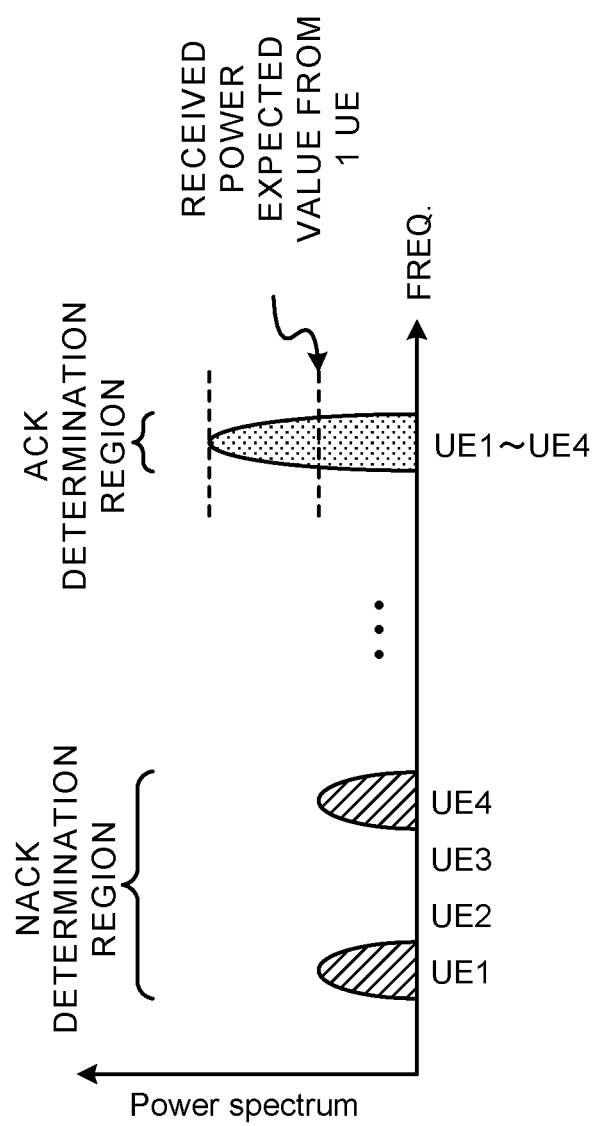

FIG. 12 contains diagrams showing one example of UCI detection in Embodiment 2. In the example of FIG. 12, UCI is transmitted in the same resources as in FIG. 7, and FIG. 12 differs from FIG. 7 in the respect of applying precoding and transmit power control to resources.

Power observed in the ACK determination region is power of mixed signals of transmission signals of UE2 and UE3. The base station determines power based on a received power expected value from one UE, and judges that ACK of two UEs is notified.

In this example, based on the measurement result of the NACK determination region, the base station determines that two UEs (UE1 and UE4) transmit NACK. Further, based on the measurement result of the ACK determination region, the base station determines that two UEs (i.e., UE2 and UE3) except two UEs that transmit NACK transmit ACK. Based on the measurement results of the NACK determination region and ACK determination region, the base station determines that all of UEs expected to transmit UCI transmit the UCI.

FIG. 13 contains diagrams showing another example of UCI detection in Embodiment 2. As shown in FIG. 13A, in this example, all of the UE1 to UE4 transmit ACK. In this case, for example, as shown in FIG. 13B, the base station observes power in resources of the ACK determination region. On the other hand, any received signal is not observed in the NACK determination region.

By received power measurement of the ACK determination region, in the case where the base station is capable of estimating that the number of UEs that transmit ACK is equal to the number of all UEs with resources allocated (e.g., the number is "4"), the station may judge that all UEs (all UEs with resources allocated) expected to transmit UCI transmit the UCI. Further, although any received signal is not observed in the NACK determination region, in the case where the base station estimates that the number (e.g., "3") of UEs that transmit ACK is lower than the number of UEs with resources allocated, the station may estimate that all UEs transmit ACK, or may notify all UEs with resources allocated of a retransmission request, as in the case where all UEs transmit NACK.

In addition, as described in Embodiment 1, also in Embodiment 2, NACK and ACK may be replaced with each other as an Embodiment. In other words, NACK resources may be overlapped and multiplexed.

Further, Embodiment 2 is based on the assumption that the transmission signal of the overlapped and multiplexed UCI transmission resource is corrected and transmitted so that received signals of the resource are subjected to in-phase addition, but is not limited thereto. For example, as long as the base station is capable of estimating the number of UEs such that signals are multiplexed into the UCI transmission resource based on the received signal of the resource, any correction except that received signals are subjected to in-phase addition may be applied to transmission signals.

According to Embodiment 2 as described above, it is possible to suppress decreases in determination accuracy of UCI, while reducing overhead of UCI resources.

<Embodiment 3>

In Embodiments 1 and 2, two resources are reserved to notify of 1 bit, and in Embodiment 3, notification of 1 bit is performed in one resource. In other words, UCI is notified by whether or not a signal is transmitted in some resource. Embodiment 3 may be considered an Embodiment of using only UCI resources that do not overlap in Embodiment 1.

FIG. 14 contains diagrams showing one example of allocation of UCI transmission resources according to Embodiment 3. Herein, the example is shown where information of 1 bit is allocated to one UE as UCI with no need of DMRS. FIGS. 14A to 14D correspond to allocation of UCI transmission resources to UE1 to UE4, respectively, and different resources are allocated as UCI transmission resources.

The UCI transmission resource information may be configured for (notified to) the UE. The notification may be performed by higher layer signaling (e.g., RRC signaling), physical layer signaling (e.g., DCI) or combination thereof.

For example, in the case of notifying of UCI of 1 bit, one resource is allocated to one UE, and the UE is notified of information on the one resource as UCI the transmission resource information.

Corresponding to (description) of the UCI to notify, the UE determines whether or not to transmit a signal in the allocated UCI resource. For example, the UE may determine to transmit when the UCI is ACK, and not to transmit when the UCI is NACK. Conversely, the UE may determine to transmit when the UCI is NACK, and not to transmit when the UCI is ACK.

According to Embodiment 3 as described above, it is possible to reduce overhead of UCI resources and suppress increases in spectral usage efficiency.

<Embodiment 4>

In Embodiment 4, UCI is notified by whether or not to transmit a signal in some resource as in Embodiment 3, but Embodiment 4 differs from Embodiment 3 in the respect that the resource is the overlapped resource as in Embodiments 1 and 2. In other words, Embodiment 4 may be considered an Embodiment of using only the overlapped UCI resource in Embodiment 1 or 2.

FIG. 15 contains diagrams showing one example of allocation of UCI transmission resources according to Embodiment 4. Herein, the example is shown where information of 1 bit is allocated to one UE as UCI with no need of DMRS. FIGS. 15A to 15D correspond to allocation of UCI transmission resources to UE1 to UE4, respectively, and overlapped (or same) resources are allocated as UCI transmission resources (ACK resources).

The UCI transmission resource information may be configured for (notified to) the UE. The notification may be performed by higher layer signaling (e.g., RRC signaling), physical layer signaling (e.g., DCI) or combination thereof.

The UCI transmission resource information is information to identify the ACK resource. Herein, the UE may assume that the resource is not orthogonal (is overlapped) for each multiplexed UE. Further, as described in Embodiment 2, the UE may apply precoding and/or transmission power control to the ACK resource, or may not apply any of them.

Corresponding to (description) of the UCI to notify, the UE determines whether or not to transmit a signal in the allocated UCI resource. The UE determines to transmit when the UCI is ACK, and not to transmit when the UCI is NACK.

By performing measurement (e.g., received power measurement) of the ACK resource, the base station may estimate the number of UEs that transmit ACK. For example, in the case of performing transmit power control on the ACK resource, the base station is capable of grasping an expected value of received power per UE. Further, a plurality of pieces of UCI multiplexed in the overlapped resources may be subjected to in-phase combining by precoding, and by ascertaining that measured received power corresponds to expected values of received power of a number of UEs, the base station may estimate the number of UEs that transmit the UCI.

Figure 16B:
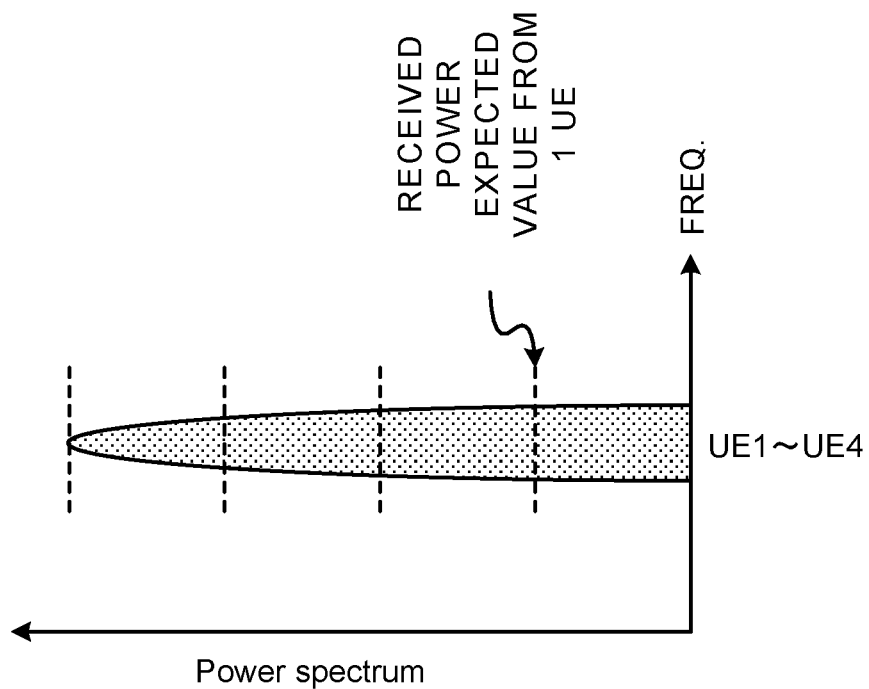
FIGS. 16A and 16B are diagrams showing one example of UCI detection in Embodiment 4.
Figure 16A:
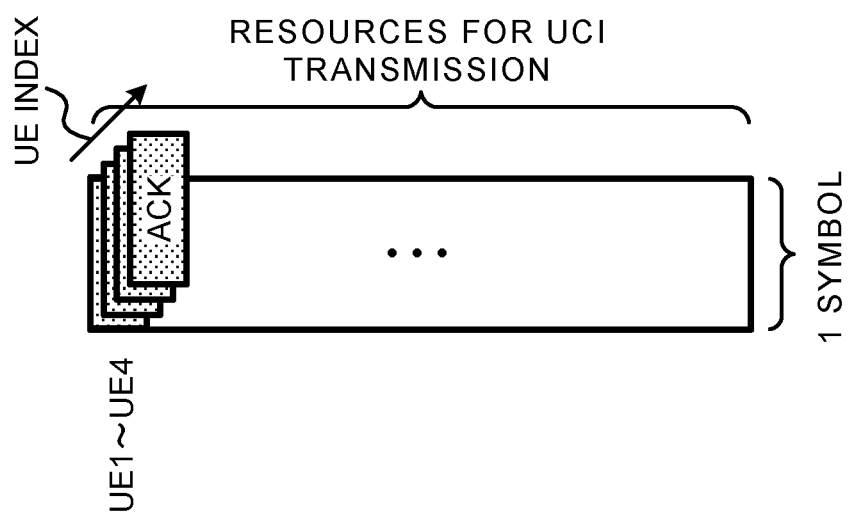

FIG. 16 contains diagrams showing one example of UCI detection in Embodiment 4. As shown in FIG. 16A, in this example, all of UE1 to UE4 transmit ACK. In this case, for example, as shown in FIG. 16B, the base station observes power in the ACK resource.

By received power measurement of the ACK resource, in the case where the base station is capable of estimating that the number of UEs that transmit ACK is equal to the number of all UEs with resources allocated (e.g., the number is "4"), the station may judge that all UEs expected to transmit UCI transmit the UCI. Further, in the case where the base station estimates that the number (e.g., "3") of UEs that transmit ACK is lower than the number of UEs with resources allocated, the station may estimate that all UEs transmit ACK, or may notify all UEs with resources allocated of a retransmission request.

In addition, also in Embodiment 4, NACK and ACK may be replaced with each other as an Embodiment. In other words, NACK resources may be overlapped and multiplexed.

FIG. 17 contains diagrams showing another example of allocation of UCI transmission resources according to Embodiment 4. Herein, the example is shown where information of 1 bit is allocated to one UE as UCI with no need of DMRS. FIGS. 17A to 17D correspond to allocation of UCI transmission resources to UE1 to UE4, respectively, and overlapped (or same) resources are allocated as UCI transmission resources (NACK resources).

The UCI transmission resource information may be configured for (notified to) the UE. The notification may be performed by higher layer signaling (e.g., RRC signaling), physical layer signaling (e.g., DCI) or combination thereof.

The UCI transmission resource information is information to identify the NACK resource. Herein, the UE may assume that the resource is not orthogonal (is overlapped) for each multiplexed UE. Further, as described in Embodiment 2, the UE may apply precoding and/or transmission power control to the NACK resource, or may not apply any of them.

Corresponding to (description) of the UCI to notify, the UE determines whether or not to transmit a signal in the allocated UCI resource. The UE determines to transmit when the UCI is NACK, and not to transmit when the UCI is ACK.

By performing measurement (e.g., received power measurement) of the NACK resource, the base station may determine the UCI. For example, in the case where received power of a predetermined threshold or more is measured in the NACK resource, the base station determines that at least one or more UEs with resources allocated transmit NACK, and as in the case where all UEs notify of NACK, may notify all UEs of a retransmission request. Further, in the case where received power of a predetermined threshold or more is not measured in the NACK resource, the base station determines that any of UEs with resources allocated do not transmit NACK, and may assume that all UEs notify of ACK.

Figure 18B:
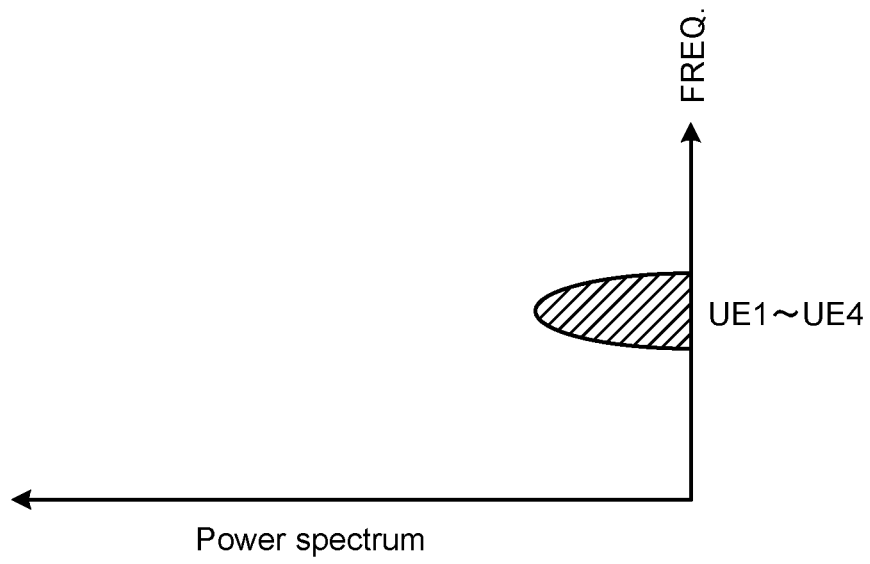
FIGS. 18A and 18B are diagrams showing another example of UCI detection in Embodiment 4.
Figure 18A:
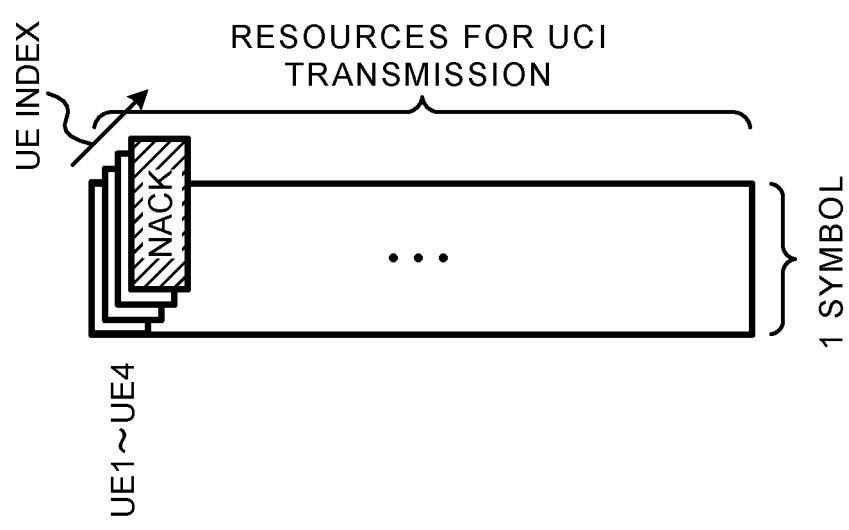

FIG. 18 contains diagrams showing another example of UCI detection in Embodiment 4. As shown in FIG. 18A, in this example, UE1 transmits NACK. In this case, for example, as shown in FIG. 18B, the base station observes power in the NACK resource. By received power measurement of the NACK resource, the base station determines that at least one of UEs with resources allocated transmits NACK.

In addition, in Embodiment 4, it is preferable that the transmission signal of the overlapped and multiplexed UCI transmission resource is corrected and transmitted so that received signals of the resource are subjected to in-phase addition, but the invention is not limited thereto. For example, as long as the base station is capable of estimating the number of UEs such that signals are multiplexed into the UCI transmission resource based on the received signal of the resource, any correction except that received signals are subjected to in-phase addition may be applied to transmission signals.

According to Embodiment 4 as described above, it is possible to reduce overhead of UCI resources and suppress decreases in spectral usage efficiency.

<Modification>

In the above-mentioned Embodiments, ACK/NACK is described as UCI to notify as an example, but the invention is not limited thereto. The UCI to notify may include a scheduling request (SR), or may include channel state information (CSI). For example, instead of ACK/NACK, the presence/absence of SR may be notified using UCI transmission resources.

Further, ACK/NACK may be subjected to bundling. For example, ACK/NACK may be ACK/NACK subjected to space bundling with respect to a plurality of codewords, or may be ACK/NACK subjected to time-domain bundling in a plurality of times.

(Radio Communication System)

A configuration of a radio communication system according to one Embodiment of the present invention will be described below. In the radio communication system, communication is performed by using any of the radio communication methods according to above-mentioned each Embodiment of the invention or combination thereof.

Figure 19:
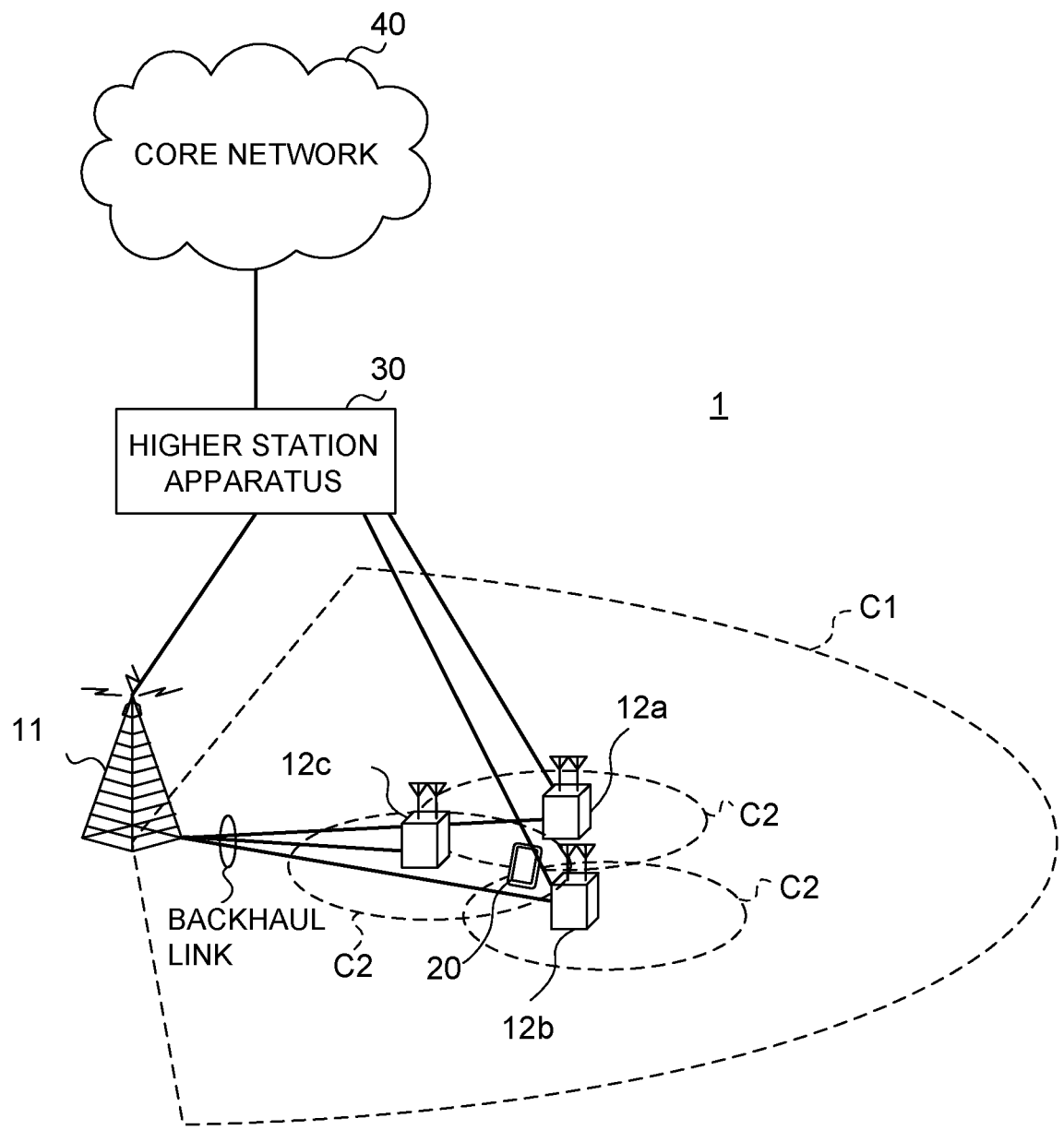
FIG. 19 is a diagram showing one example of a schematic configuration of a radio communication system according to one Embodiment of the present invention.

FIG. 19 is a diagram showing one example of a schematic configuration of the radio communication system according to one Embodiment of the present invention. In the radio communication system 1, it is possible to apply carrier aggregation (CA) to aggregate a plurality of base frequency blocks (component carriers) with a system bandwidth (e.g., 20 MHz) of the LTE system as one unit and/or dual connectivity (DC).

In addition, the radio communication system 1 may be called LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology) and the like, or may be called the system to actualize each system described above.

The radio communication system 1 is provided with a radio base station 11 for forming a macrocell C1 with relatively wide coverage, and radio base stations 12 (12a to 12c) disposed inside the macrocell C1 to form small cells C2 narrower than the macrocell C1. Further, a user terminal 20 is disposed in the macrocell C1 and each of the small cells C2. The arrangement of each cell and user terminal 20 is not limited to the arrangement shown in the figure.

The user terminal 20 is capable of connecting to both the radio base station 11 and the radio base station 12. The user terminal 20 is assumed to concurrently use the macrocell C1 and small cell C2 using CA or DC. Further, the user terminal 20 may apply CA or DC using a plurality of cells (CCs) (e.g., 5 CCs or less, 6 CCs or more).

The user terminal 20 and radio base station 11 are capable of communicating with each other using carriers (also called the existing carrier, legacy carrier and the like) with a narrow bandwidth in a relatively low frequency band (e.g., 2 GHz). On the other hand, the user terminal 20 and radio base station 12 may use carriers with a wide bandwidth in a relatively high frequency band (e.g., 3.5 GHz, 5 GHz, etc.), or may use the same carrier as in the radio base station 11. In addition, the configuration of the frequency band used in each radio base station is not limited thereto.

It is possible to configure so that the radio base station 11 and radio base station 12 (or, two radio base stations 12) undergo wired connection (e.g., optical fiber in conformity with CPRI (Common Public Radio Interface), X2 interface, etc.), or wireless connection.

The radio base station 11 and each of the radio base stations 12 are respectively connected to a higher station apparatus 30, and are connected to a core network 40 via the higher station apparatus 30. In addition, for example, the higher station apparatus 30 includes an access gateway apparatus, Radio Network Controller (RNC), Mobility Management Entity (MME) and the like, but is not limited thereto. Further, each of the radio base stations 12 may be connected to the higher station apparatus 30 via the radio base station 11.

In addition, the radio base station 11 is a radio base station having relatively wide coverage, and may be called a macro base station, collection node, eNB (eNodeB), transmission and reception point and the like. Further, the radio base station 12 is a radio base station having local coverage, and may be called a small base station, micro-base station, pico-base station, femto-base station, HeNB (Home eNodeB), RRH (Remote Radio Head), transmission and reception point and the like. Hereinafter, in the case of not distinguishing between the radio base stations 11 and 12, the stations are collectively called a radio base station 10.

Each user terminal 20 is a terminal supporting various communication schemes such as LTE and LTE-A, and may include a fixed communication terminal (fixed station), as well as the mobile communication terminal (mobile station).

In the radio communication system 1, as radio access schemes, Orthogonal Frequency Division Multiple Access (OFDMA) is applied on downlink, and Single Carrier Frequency Division Multiple Access (SC-FDMA) is applied on uplink.

OFDMA is a multicarrier transmission scheme for dividing a frequency band into a plurality of narrow frequency bands (subcarriers), and mapping data to each subcarrier to perform communication. SC-FDMA is a single-carrier transmission scheme for dividing a system bandwidth into bands comprised of one or contiguous resource blocks for each terminal so that a plurality of terminals uses mutually different bands, and thereby reducing interference among terminals. In addition, uplink and downlink radio access schemes are not limited to the combination of the schemes, and another radio access scheme may be used.

As downlink channels, in the radio communication system 1 are used a downlink shared channel (PDSCH: Physical Downlink Shared Channel) shared by user terminals 20, broadcast channel (PBCH: Physical Broadcast Channel), downlink L1/L2 control channels and the like. User data, higher layer control information, SIB (System Information Block) and the like are transmitted on the PDSCH. Further, MIB (Master Information Block) is transmitted on the PBCH.

The downlink L1/L2 control channel includes PDCCH (Physical Downlink Control Channel), EPDCCH (Enhanced Physical Downlink Control Channel), PCFICH (Physical Control Format Indicator Channel), PHICH (Physical Hybrid-ARQ Indicator Channel) and the like. The downlink control information (DCI) including scheduling information of the PDSCH and PUSCH and the like is transmitted on the PDCCH. The number of OFDM symbols used in the PDCCH is transmitted on the PCFICH. Receipt confirmation information (e.g., also referred to as retransmission control information, HARQ-ACK, ACK/NACK, etc.) of HARQ (Hybrid Automatic Repeat reQuest) for the PUSCH is transmitted on the PHICH. The EPDCCH is frequency division multiplexed with the PDSCH (downlink shared data channel) to be used in transmitting the DCI and the like as the PDCCH.

As uplink channels, in the radio communication system 1 are used an uplink shared channel (PUSCH: Physical Uplink Shared Channel) shared by user terminals 20, uplink control channel (PUCCH: Physical Uplink Control Channel), random access channel (PRACH: Physical Random Access Channel) and the like. User data, higher layer control information and the like is transmitted on the PUSCH. Further, radio quality information (CQI: Channel Quality Indicator) of downlink, receipt confirmation information and the like are transmitted on the PUCCH. A random access preamble to establish connection with the cell is transmitted on the PRACH.

As downlink reference signals, in the radio communication system 1 are transmitted Cell-specific Reference Signal (CRS), Channel State Information-Reference Signal (CSI-RS), Demodulation Reference Signal (DMRS: DeModulation Reference Signal), Positioning Reference Signal (PRS) and the like. Further, as uplink reference signals, in the radio communication system 1 are transmitted Sounding Reference Signal (SRS), Demodulation Reference Signal (DMRS) and the like. In addition, the DMRS may be called UE-specific Reference Signal. Further, the transmitted reference signals are not limited thereto.

(Radio Base Station)

Figure 20:
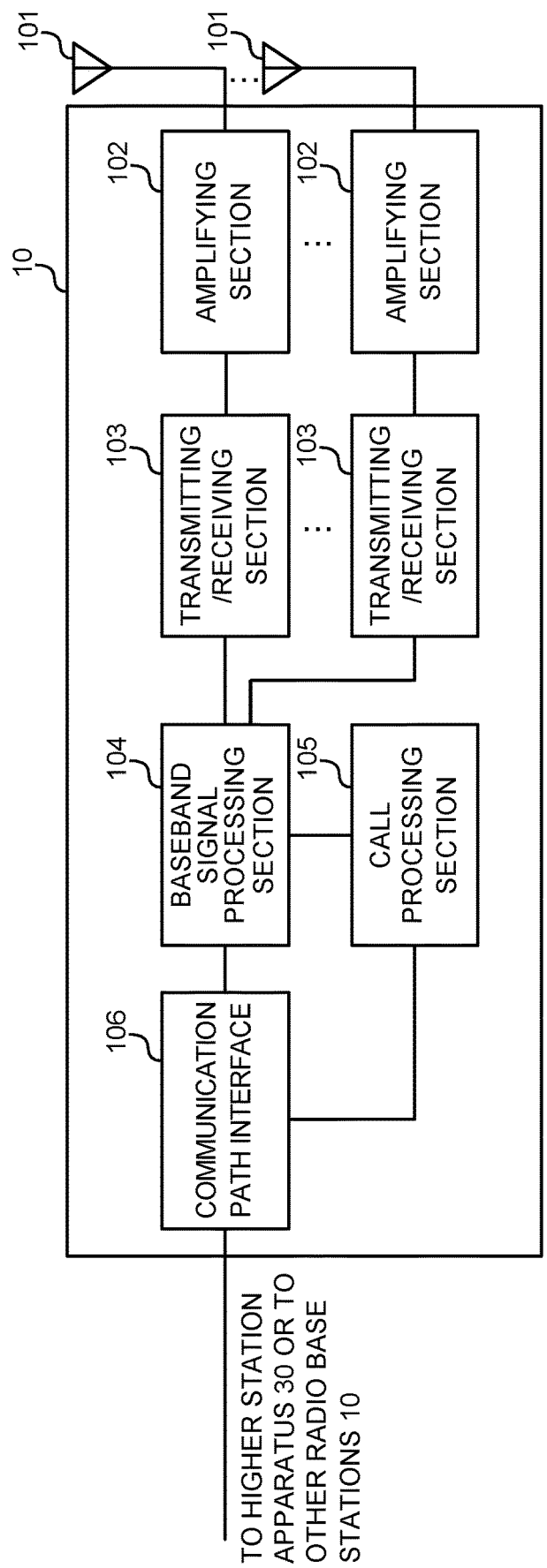
FIG. 20 is a diagram showing one example of an entire configuration of a radio base station according to one Embodiment of the invention.
Figure 21:
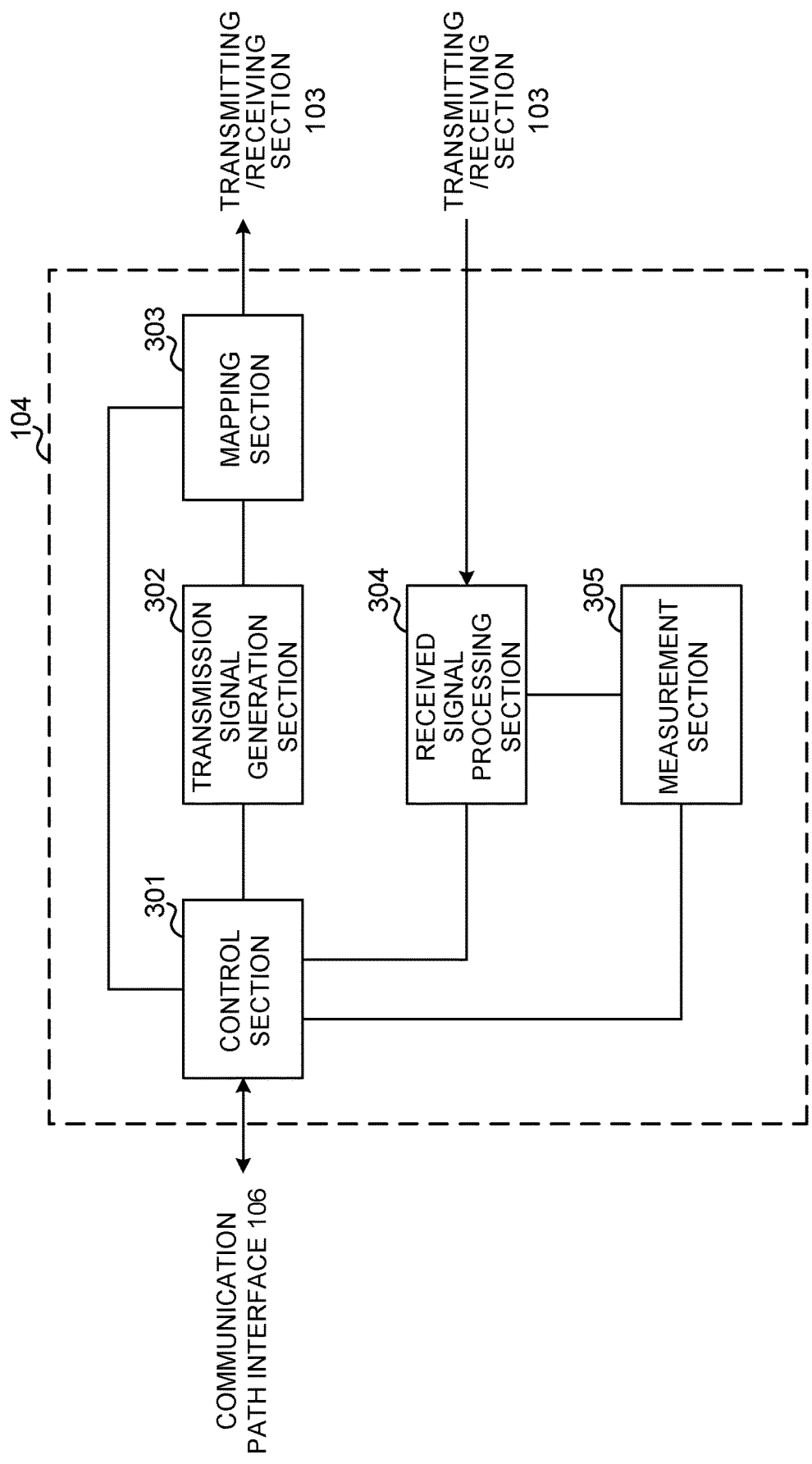
FIG. 21 is a diagram showing one example of a function configuration of the radio base station according to one Embodiment of the invention.

FIG. 20 is a diagram showing one example of an entire configuration of the radio base station according to one Embodiment of the present invention. The radio base station 10 is provided with a plurality of transmitting/receiving antennas 101, amplifying sections 102, transmitting/receiving sections 103, baseband signal processing section 104, call processing section 105, and communication path interface 106. In addition, with respect to each of the transmitting/receiving antenna 101, amplifying section 102, and transmitting/receiving section 103, the radio base station may be configured to include at least one or more.

User data to transmit to the user terminal 20 from the radio base station 10 on downlink is input to the baseband signal processing section 104 from the higher station apparatus 30 via the communication path interface 106.

The baseband signal processing section 104 performs, on the user data, transmission processing such as processing of PDCP (Packet Data Convergence Protocol) layer, segmentation and concatenation of the user data, transmission processing of RLC (Radio Link Control) layer such as RLC retransmission control, MAC (Medium Access Control) retransmission control (e.g., transmission processing of HARQ), scheduling, transmission format selection, channel coding, Inverse Fast Fourier Transform (IFFT) processing, and precoding processing to transfer to the transmitting/receiving sections 103. Further, also concerning a downlink control signal, the section 104 performs transmission processing such as channel coding and Inverse Fast Fourier Transform on the signal to transfer to the transmitting/receiving sections 103.

Each of the transmitting/receiving sections 103 converts the baseband signal, which is subjected to precoding for each antenna and is output from the baseband signal processing section 104, into a signal with a radio frequency band to transmit. The radio-frequency signal subjected to frequency conversion in the transmitting/receiving section 103 is amplified in the amplifying section 102, and is transmitted from the transmitting/receiving antenna 101. The transmitting/receiving section 103 is capable of being comprised of a transmitter/receiver, transmitting/receiving circuit or transmitting/receiving apparatus explained based on common recognition in the technical field according to the present invention. In addition, the transmitting/receiving section 103 may be comprised as an integrated transmitting/receiving section, or may be comprised of a transmitting section and receiving section.

On the other hand, for uplink signals, radio-frequency signals received in the transmitting/receiving antennas 101 are amplified in the amplifying sections 102. The transmitting/receiving section 103 receives the uplink signal amplified in the amplifying section 102. The transmitting/receiving section 103 performs frequency conversion on the received signal into a baseband signal to output to the baseband signal processing section 104.

For user data included in the input uplink signal, the baseband signal processing section 104 performs Fast Fourier Transform (FFT) processing, Inverse Discrete Fourier Transform (IDFT) processing, error correcting decoding, reception processing of MAC retransmission control, and reception processing of RLC layer and PDCP layer to transfer to the higher station apparatus 30 via the communication path interface 106. The call processing section 105 performs call processing (configuration, release and the like) of a communication channel, state management of the radio base station 10, management of radio resources and the like.

The communication path interface 106 transmits and receives signals to/from the higher station apparatus 30 via a predetermined interface. Further, the communication path interface 106 may transmit and receive signals (backhaul signaling) to/from another radio base station 10 via an inter-base station interface (e.g., optical fiber in conformity with CPRI (Common Public Radio Interface), X2 interface).

The transmitting/receiving section 103 receives a predetermined signal (e.g., predetermined signal sequence) in a predetermined resource allocated to the user terminal 20 by a control section 301 described later. The transmitting/receiving section 103 may receive the predetermined signal with precoding and/or transmit power control applied thereto.

The transmitting/receiving section 103 transmits, to the user terminal 20, information on UCI transmission resources, information on precoding to apply to UCI transmission resources, information on transmit power control to apply to UCI transmission resources, and the like.

FIG. 12 is a diagram showing one example of a function configuration of the radio base station according to one Embodiment of the present invention. In addition, this example mainly illustrates function blocks of a characteristic portion in this Embodiment, and the radio base station 10 is assumed to have other function blocks required for radio communication.

The baseband signal processing section 104 is provided with at least a control section (scheduler) 301, transmission signal generating section 302, mapping section 303, received signal processing section 304, and measurement section 305. In addition, these components are essentially included in the radio base station 10, and a part or the whole of the components may not be included in the baseband signal processing section 104.

The control section (scheduler) 301 performs control of the entire radio base station 10. The control section 301 is capable of being comprised of a controller, control circuit or control apparatus explained based on the common recognition in the technical field according to the present invention.

For example, the control section 301 controls generation of signals by the transmission signal generating section 302, allocation of signals by the mapping section 303 and the like. Further, the control section 301 controls reception processing of signals by the received signal processing section 304, measurement of signals by the measurement section 305 and the like.

The control section 301 controls scheduling (e.g., resource allocation) of system information, downlink data signal (e.g., signal transmitted on the PDSCH), and downlink control signal (e.g., signal transmitted on the PDCCH and/or EPDCCH). Further, based on a result obtained by determining the necessity of retransmission control to an uplink data signal, and the like, the control section 301 controls generation of the downlink control signal (e.g., receipt confirmation signal, etc.), downlink data signal and the like. Furthermore, the control section 301 performs scheduling of synchronization signals (e.g., PSS (Primary Synchronization Signal)/SSS (Secondary Synchronization Signal)), downlink reference signals (e.g., CRS, CSI-RS, DMRS) and the like.

Further, the control section 301 controls scheduling of the uplink data signal (e.g., signal transmitted on the PUSCH), uplink control signal (e.g., signal transmitted on the PUCCH and/or PUSCH), random access preamble transmitted on the PRACH, uplink reference signal and the like.

The control section 301 performs control for allocating resources for uplink control information (e.g., UCI) transmission to the user terminal 20. Herein, the resource includes at least one of first resources that are not allocated (e.g., not allocated concurrently) to other user terminals 20, and second resources that are allocated (e.g., allocated concurrently) also to other user terminals 20.

Based on a measurement result (e.g., received power measurement result) acquired from the measurement section 305, the control section 301 determines UCI implicitly notified from the user terminal 20 in association with the resource. For example, in the case where the control section 301 does not judge that all of a plurality of user terminals 20 allocated to predetermined second resources transmit UCI, the section 301 may control for instructing the plurality of user terminals 20 to retransmit the UCI.

The control section 301 may perform control for transmitting, to the user terminal 20, information (e.g., information on precoding) to correct a transmission signal of the second resource so that received signals in the second resource are subjected to in-phase addition.

Based on instructions from the control section 301, the transmission signal generating section 302 generates downlink signals (downlink control signal, downlink data signal, downlink reference signal, etc.) to output to the mapping section 303. The transmission signal generating section 302 is capable of being comprised of a signal generator, signal generating circuit or signal generating apparatus explained based on the common recognition in the technical field according to the present invention.

For example, based on instructions from the control section 301, the transmission signal generating section 302 generates DL assignment to notify of assignment information of downlink signals and UL grant to notify of assignment information of uplink signals. Further, the downlink data signal is subjected to coding processing and modulation processing, according to a coding rate, modulation scheme and the like determined based on the channel state information (CSI) from each user terminal 20 and the like.

Based on instructions from the control section 301, the mapping section 303 maps the downlink signal generated in the transmission signal generating section 302 to predetermined radio resources to output to the transmitting/receiving section 103. The mapping section 303 is capable of being comprised of a mapper, mapping circuit or mapping apparatus explained based on the common recognition in the technical field according to the present invention.

The received signal processing section 304 performs reception processing (e.g., demapping, demodulation, decoding, etc.) on the received signal input from the transmitting/receiving section 103. Herein, for example, the received signal is the uplink signal (uplink control signal, uplink data signal, uplink reference signal, etc.) transmitted from the user terminal 20. The received signal processing section 304 is capable of being comprised of a signal processor, signal processing circuit or signal processing apparatus explained based on the common recognition in the technical field according to the present invention.

The received signal processing section 304 outputs the information decoded by the reception processing to the control section 301. For example, in the case of receiving the PUCCH including HARQ-ACK, the section 304 outputs the HARQ-ACK to the control section 301. Further, the received signal processing section 304 outputs the received signal and/or signal subjected to the reception processing to the measurement section 305.

The measurement section 305 performs measurement on the received signal. The measurement section 305 is capable of being comprised of a measurement device, measurement circuit or measurement apparatus explained based on the common recognition in the technical field according to the present invention.

For example, based on the received signal, the measurement section 305 may perform RRM (Radio Resource Management) measurement, CSI (Channel State Information) measurement and the like. The measurement section 305 may measure received power (e.g., RSRP (Reference Signal Received Power)), received quality (e.g., RSRQ (Reference Signal Received Quality), SINR (Signal to Interference plus Noise Ratio)), power strength (e.g., RSSI (Received Signal Strength Indicator)), uplink propagation path information (e.g., CSI) and the like. The measurement result may be output to the control section 301.

(User Terminal)

Figure 22:
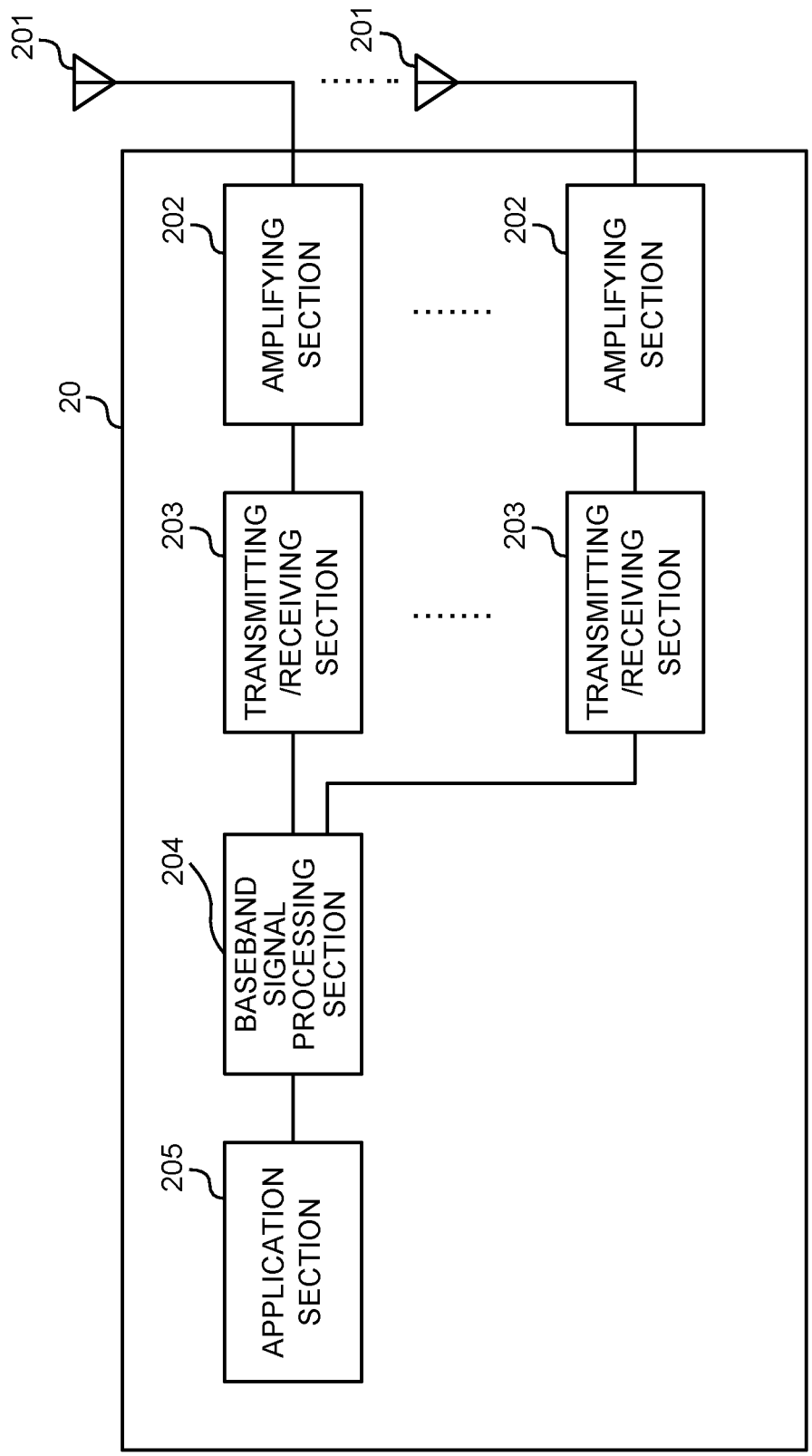
FIG. 22 is a diagram showing one example of an entire configuration of a user terminal according to one Embodiment of the invention.

FIG. 22 is a diagram showing one example of an entire configuration of the user terminal according to one Embodiment of the present invention. The user terminal 20 is provided with a plurality of transmitting/receiving antennas 201, amplifying sections 202, transmitting/receiving sections 203, baseband signal processing section 204, and application section 205. In addition, with respect to each of the transmitting/receiving antenna 201, amplifying section 202, and transmitting/receiving section 203, the user terminal may be configured to include at least one or more.

Radio-frequency signals received in the transmitting/receiving antennas 201 are respectively amplified in the amplifying sections 202. Each of the transmitting/receiving sections 203 receives the downlink signal amplified in the amplifying section 202. The transmitting/receiving section 203 performs frequency conversion on the received signal into a baseband signal to output to the baseband signal processing section 204. The transmitting/receiving section 203 is capable of being comprised of a transmitter/receiver, transmitting/receiving circuit or transmitting/receiving apparatus explained based on the common recognition in the technical field according to the present invention. In addition, the transmitting/receiving section 203 may be comprised as an integrated transmitting/receiving section, or may be comprised of a transmitting section and receiving section.

The baseband signal processing section 204 performs FFT processing, error correcting decoding, reception processing of retransmission control and the like on the input baseband signal. User data on downlink is transferred to the application section 205. The application section 205 performs processing concerning layers higher than the physical layer and MAC layer, and the like. Further, among the downlink data, broadcast information may also be transferred to the application section 205.

On the other hand, for user data on uplink, the data is input to the baseband signal processing section 204 from the application section 205. The baseband signal processing section 204 performs transmission processing of retransmission control (e.g., transmission processing of HARQ), channel coding, precoding, Discrete Fourier Transform (DFT) processing, IFFT processing and the like to transfer to each of the transmitting/receiving sections 203. Each of the transmitting/receiving sections 203 converts the baseband signal output from the baseband signal processing section 204 into a signal with a radio frequency band to transmit. The radio-frequency signals subjected to frequency conversion in the transmitting/receiving sections 203 are amplified in the amplifying sections 202, and are transmitted from the transmitting/receiving antennas 201, respectively.

In the case where a control section 401 described later determines that a predetermined resource is used in transmission, the transmitting/receiving section 203 transmits a signal in the predetermined resource. In the case where the control section 401 described later determines that the first resource and/or the second resource is used in transmission, the transmitting/receiving section 203 may transmit a signal with precoding and/or transmit power control applied.

The transmitting/receiving section 203 may receive, from the radio base station 10, the information on UCI transmission resources, information on precoding to apply to UCI transmission resources, information on transmit power control to apply to UCI transmission resources, and the like.

Figure 23:
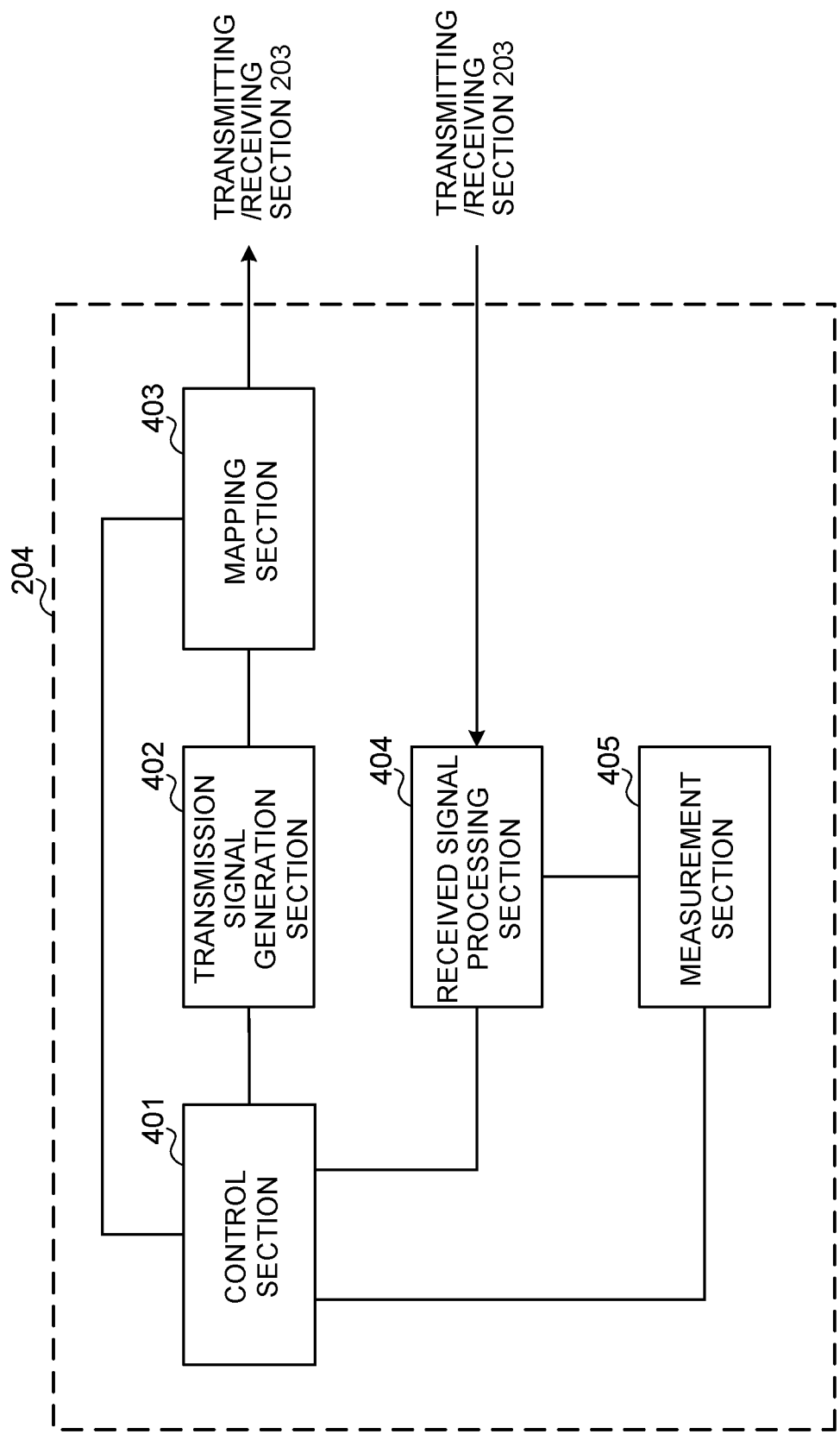
FIG. 23 is a diagram showing one example of a function configuration of the user terminal according to one Embodiment of the invention.

FIG. 23 is a diagram showing one example of a function configuration of the user terminal according to one Embodiment of the present invention. In addition, this example mainly illustrates function blocks of a characteristic portion in this Embodiment, and the user terminal 20 is assumed to have other function blocks required for radio communication.

The baseband signal processing section 204 that the user terminal 20 has is provided with at least a control section 401, transmission signal generating section 402, mapping section 403, received signal processing section 404, and measurement section 405. In addition, these components are essentially included in the user terminal 20, and a part or the whole of the components may not be included in the baseband signal processing section 204.

The control section 401 performs control of the entire user terminal 20. The control section 401 is capable of being comprised of a controller, control circuit or control apparatus explained based on the common recognition in the technical field according to the present invention.

For example, the control section 401 controls generation of signals by the transmission signal generating section 402, allocation of signals by the mapping section 403 and the like. Further, the control section 401 controls reception processing of signals by the received signal processing section 404, measurement of signals by the measurement section 405 and the like.

The control section 401 acquires the downlink control signal (e.g., signal transmitted on the PDCCH/EPDCCH) and downlink data signal (e.g., signal transmitted on the PDSCH) transmitted from the radio base station 10, from the received signal processing section 404. Based on the downlink control signal and/or a result obtained by determining the necessity of retransmission control to the downlink data signal, and the like, the control section 401 controls generation of the uplink control signal (e.g., receipt confirmation information, etc.) and/or uplink data signal.

Based on uplink control information (e.g., UCI) to notify (try to notify), the control section 401 determines whether or not to use the predetermined resource in transmission. Herein, the predetermined resource may be one of the first resource that is not allocated (e.g., not allocated concurrently) to other user terminals 20, and the second resource that is allocated (e.g., allocated concurrently) also to other user terminals 20. The control section 401 may determine whether or not to use one of the first resource and the second resource in transmission, or may determine whether or not to use both of the resources in transmission.

In the case where the UCI is predetermined information (e.g., one of ACK and NACK), the control section 401 may determine that one of the first resource and the second resource is used in transmission. Further, in the case where the UCI is information different from the above-mentioned predetermined information (e.g., one of NACK and ACK), the control section 401 may determine that the other one of the first resource and the second resource is used in transmission.

In the case where the UCI is the information different from the above-mentioned predetermined information, the control section 401 may determine that both of the first resource and the second resource are not used in transmission (to perform discontinuous transmission (DTX)).

In addition, the first resource may be comprised of one or more mutually orthogonal resources. The second resource may be one resource, or may be two or more resources.

Further, at least one of the first resource and the second resource may be a resource defined by specifications, or fixedly defined resource.

Further, it is preferable that the first resource and the second resource are mutually orthogonal. The first resource is not limited to resources that are not allocated to other user terminals 20. The second resource is not limited to resources that are allocated to other user terminals 20.

When the control section 401 determines that the predetermined resource is used in transmission of UCI, the section 401 controls to transmit a predetermined signal (e.g., predetermined signal sequence) in the predetermined resource. In the case where the control section 401 determines that the first resource and/or the second resource is used in transmission, the section 401 may perform control for applying precoding and/or transmit power control to the transmission signal.

Further, in the case where the control section 401 acquires various pieces of information notified from the radio base station 10, from the received signal processing section 404, the section 401 may update a parameter used in control based on the information.

Based on instructions from the control section 401, the transmission signal generating section 402 generates uplink signals (uplink control signal, uplink data signal, uplink reference signal, etc.) to output to the mapping section 403. The transmission signal generating section 402 is capable of being comprised of a signal generator, signal generating circuit or signal generating apparatus explained based on the common recognition in the technical field according to the present invention.

For example, based on instructions from the control section 401, the transmission signal generating section 402 generates the uplink control signal about receipt confirmation information, channel state information (CSI) and the like. Further, based on instructions from the control section 401, the transmission signal generating section 402 generates the uplink data signal. For example, when the downlink control signal notified from the radio base station 10 includes the UL grant, the transmission signal generating section 402 is instructed to generate the uplink data signal from the control section 401.

Based on instructions from the control section 401, the mapping section 403 maps the uplink signal generated in the transmission signal generating section 402 to radio resources to output to the transmitting/receiving section 203. The mapping section 403 is capable of being comprised of a mapper, mapping circuit or mapping apparatus explained based on the common recognition in the technical field according to the present invention.

The received signal processing section 404 performs reception processing (e.g. demapping, demodulation, decoding, etc.) on the received signal input from the transmitting/receiving section 203. Herein, for example, the received signal is the downlink signal (downlink control signal, downlink data signal, downlink reference signal, etc.) transmitted from the radio base station 10. The received signal processing section 404 is capable of being comprised of a signal processor, signal processing circuit or signal processing apparatus explained based on the common recognition in the technical field according to the present invention. Further, the received signal processing section 404 is capable of constituting the receiving section according to the present invention.

The received signal processing section 404 outputs the information decoded by the reception processing to the control section 401. For example, the received signal processing section 404 outputs the broadcast information, system information, RRC signaling, DCI and the like to the control section 401. Further, the received signal processing section 404 outputs the received signal and/or signal subjected to the reception processing to the measurement section 405.

The measurement section 405 performs measurement on the received signal. For example, the measurement section 405 performs measurement using the downlink reference signal transmitted from the radio base station 10. The measurement section 405 is capable of being comprised of a measurement device, measurement circuit or measurement apparatus explained based on the common recognition in the technical field according to the present invention.

For example, based on the received signal, the measurement section 405 may perform RRM measurement, CSI measurement and the like. The measurement section 405 may measure received power (e.g., RSRP), received quality (e.g., RSRQ, SINR), power strength (e.g., RSSI), downlink propagation path information (e.g., CSI) and the like. The measurement result may be output to the control section 401.

(Hardware Configuration)

In addition, the block diagrams used in explanation of the above-mentioned Embodiments show blocks on a function-by-function basis. These function blocks (configuration sections) are actualized by any combination of hardware and/or software. Further, the means for actualizing each function block is not limited particularly. In other words, each function block may be actualized by a single apparatus combined physically and/or logically, or two or more apparatuses that are separated physically and/or logically are connected directly and/or indirectly (e.g., by cable and/or radio), and each function block may be actualized by a plurality of these apparatuses.

Figure 24:
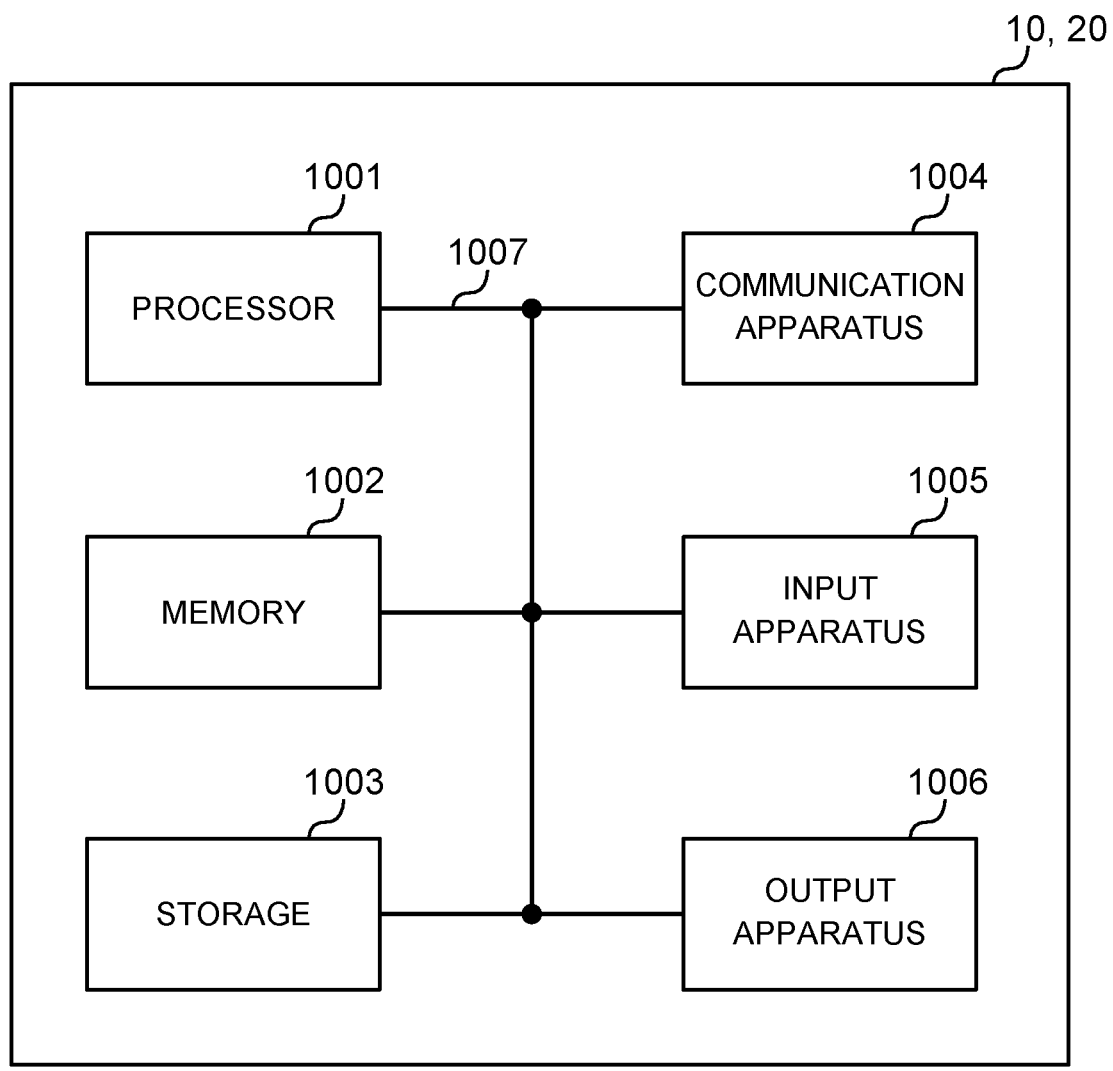
FIG. 24 is a diagram showing one example of hardware configurations of the radio base station and user terminal according to one Embodiment of the invention.

For example, each of the radio base station, user terminal and the like in one Embodiment of the present invention may function as a computer that performs the processing of the radio communication method of the invention. FIG. 24 is a diagram showing one example of a hardware configuration of each of the radio base station and user terminal according to one Embodiment of the invention. Each of the radio base station 10 and user terminal 20 as described above may be physically configured as a computer apparatus including a processor 1001, memory 1002, storage 1003, communication apparatus 1004, input apparatus 1005, output apparatus 1006, bus 1007 and the like.

In addition, in the following description, it is possible to replace the letter of "apparatus" with a circuit, device, unit and the like to read. With respect to each apparatus shown in the figure, the hardware configuration of each of the radio base station 10 and the user terminal 20 may be configured so as to include one or a plurality of apparatuses, or may be configured without including a part of apparatuses.

For example, a single processor 1001 is shown in the figure, but a plurality of processors may exist. Further, the processing may be executed by a single processor, or may be executed by one or more processors at the same time, sequentially or by another technique. In addition, the processor 1001 may be implemented on one or more chips.

For example, each function in the radio base station 10 and user terminal 20 is actualized in a manner such that predetermined software (program) is read on the hardware of the processor 1001, memory 1002 and the like, and that the processor 1001 thereby performs computations, and controls communication by the communication apparatus 1004, and read and/or write of data in the memory 1002 and storage 1003.

For example, the processor 1001 operates an operating system to control the entire computer. The processor 1001 may be comprised of a Central Processing Unit (CPU) including interfaces with peripheral apparatuses, control apparatus, computation apparatus, register and the like. For example, the above-mentioned baseband signal processing section 104 (204), call processing section 105 and the like may be actualized by the processor 1001.

Further, the processor 1001 reads the program (program code), software module, data and the like on the memory 1002 from the storage 1003 and/or the communication apparatus 1004, and according thereto, executes various kinds of processing. Used as the program is a program that causes the computer to execute at least a part of operation described in the above-mentioned Embodiments. For example, the control section 401 of the user terminal 20 may be actualized by a control program stored in the memory 1002 to operate in the processor 1001, and the other function blocks may be actualized similarly.

The memory 1002 is a computer-readable storage medium, and for example, may be comprised of at least one of ROM (Read Only Memory), EPROM (Erasable Programmable ROM), EEPROM (Electrically EPROM), RAM (Random Access Memory) and other proper storage media. The memory 1002 may be called the register, cache, main memory (main storage apparatus) and the like. The memory 1002 is capable of storing the program (program code), software module and the like executable to implement the radio communication method according to one Embodiment of the present invention.

The storage 1003 is a computer-readable storage medium, and for example, may be comprised of at least one of a flexible disk, floppy (Registered Trademark) disk, magneto-optical disk (e.g., compact disk (CD-ROM (Compact Disc ROM), etc.), digital multi-purpose disk, Blu-ray (Registered Trademark) disk), removable disk, hard disk drive, smart card, flash memory device (e.g., card, stick, key drive), magnetic stripe, database, server and other proper storage media. The storage 1003 may be called an auxiliary storage apparatus.

The communication apparatus 1004 is hardware (transmitting/receiving device) to perform communication between computers via a wired and/or wireless network, and for example, is also referred to as a network device, network controller, network card, communication module and the like. For example, in order to actualize Frequency Division Duplex (FDD) and/or Time Division Duplex (TDD), the communication apparatus 1004 may be comprised by including a high-frequency switch, duplexer, filter, frequency synthesizer and the like. For example, the transmitting/receiving antenna 101 (201), amplifying section 102 (202), transmitting/receiving section 103 (203), communication path interface 106 and the like as described above may be actualized by the communication apparatus 1004.

The input apparatus 1005 is an input device (e.g., keyboard, mouse, microphone, switch, button, sensor, etc.) that receives input from the outside. The output apparatus 1006 is an output device (e.g., display, speaker, LED (Light Emitting Diode) lamp, etc.) that performs output to the outside. In addition, the input apparatus 1005 and output apparatus 1006 may be an integrated configuration (e.g., touch panel).

Further, each apparatus of the processor 1001, memory 1002 and the like is connected on the bus 1007 to communicate information. The bus 1007 may be comprised of a single bus, or may be comprised of different buses between apparatuses.

Furthermore, each of the radio base station 10 and user terminal 20 may be configured by including hardware such as a microprocessor, Digital Signal Processor (DSP), ASIC (Application Specific Integrated Circuit), PLD (Programmable Logic Device), and FPGA (Field Programmable Gate Array), or a part or the whole of each function block may be actualized by the hardware. For example, the processor 1001 may be implemented by at least one of the hardware.

(Modification)

In addition, the term explained in the present Description and/or the term required to understand the present Description may be replaced with a term having the same or similar meaning. For example, the channel and/or the symbol may be a signal (signaling). Further, the signal may be a message. The reference signal is capable of being abbreviated as RS (Reference Signal), and according to the standard to apply, may be called a pilot, pilot signal and the like. Furthermore, a component carrier (CC) may be called a cell, frequency carrier, carrier frequency and the like.

Further, the radio frame may be comprised of one or a plurality of frames in the time domain. The one or each of the plurality of frames constituting the radio frame may be called a subframe. Furthermore, the subframe may be comprised of one or a plurality of slots in the time domain. The subframe may be a fixed time length (e.g., 1 ms) that is not dependent on numerology.

Furthermore, the slot may be comprised of one or a plurality of symbols (OFDM (Orthogonal Frequency Division Multiplexing) symbols, SC-FDMA (Single Carrier Frequency Division Multiple Access) symbols and the like) in the time domain. Still furthermore, the slot may be a time unit based on numerology. Moreover, the slot may include a plurality of mini-slots. Each mini-slot may be comprised of one or a plurality of symbols in the time domain. Further, the mini-slot may be called a subslot.

Each of the radio frame, subframe, slot, mini-slot and symbol represents a time unit in transmitting a signal. For the radio frame, subframe, slot, mini-slot and symbol, another name corresponding to each of them may be used. For example, one subframe may be called Transmission Time Interval (TTI), a plurality of contiguous subframes may be called TTI, or one slot or one mini-slot may be called TTI. In other words, the subframe and/or TTI may be the subframe (1 ms) in existing LTE, may be a frame (e.g., 1 to 13 symbols) shorter than 1 ms, or may be a frame longer than 1 ms. In addition, instead of the subframe, the unit representing the TTI may be called the slot, mini-slot and the like.

Herein, for example, the TTI refers to a minimum time unit of scheduling in radio communication. For example, in the LTE system, the radio base station performs scheduling for allocating radio resources (frequency bandwidth, transmit power and the like capable of being used in each user terminal) to each user terminal in a TTI unit. In addition, the definition of the TTI is not limited thereto.

The TTI may be a transmission time unit of a data packet (transport block) subjected to channel coding, code block and/or codeword, or may be a processing unit of scheduling, link adaptation and the like. In addition, when the TTI is given, a time segment (e.g., the number of symbols) to which the transport block, code block and/or codeword is actually mapped may be shorter than the TTI.

In addition, when one slot or one mini-slot is called the TTI, one or more TTIs (i.e., one or more slots, or one or more mini-slots) may be the minimum time unit of scheduling. Further, the number of slots (the number of mini-slots) constituting the minimum time unit of scheduling may be controlled.

The TTI having a time length of 1 ms may be called ordinary TTI (TTI in LTE Rel.8-12), normal TTI, long TTI, ordinary subframe, normal subframe, long subframe or the like. The TTI shorter than the ordinary TTI may be called shortened TTI, short TTI, partial or fractional TTI, shortened subframe, short subframe or the like.

In addition, the long TTI (e.g., normal TTI, subframe, etc.) may be read with TTI having a time length exceeding 1 ms, and the short TTI (e.g., shortened TTI, etc.) may be read with TTI having a TTI length of 1 ms or more and less than the TTI length of the long TTI.

The resource block (RB) is a resource allocation unit in the time domain and frequency domain, and may include one or a plurality of contiguous subcarriers in the frequency domain. Further, the RB may include one or a plurality of symbols in the time domain, and may be a length of 1 slot, 1 mini-slot, 1 subframe, or 1 TTI. Each of 1 TTI and 1 subframe may be comprised of one or a plurality of resource blocks. In addition, one or a plurality of RBs may be called a physical resource block (PRB: Physical RB), subcarrier group (SCG: Sub-Carrier Group), Resource Element Group (REG), PRB pair, RB pair and the like.

Further, the resource block may be comprised of one or a plurality of resource elements (RE: Resource Element) For example, 1 RE may be a radio resource region of 1 subcarrier and 1 symbol.

In addition, structures of the above-mentioned radio frame, subframe, slot, mini-slot, symbol and the like are only illustrative. For example, it is possible to modify, in various manners, configurations of the number of subframes included in the radio frame, the number of slots per subframe or radio frame, the number of mini-slots included inside the slot, the numbers of symbols and RBs included in the slot or mini-slot, the number of subcarriers included in the RB, the number of symbols within the TTI, the symbol length, the cyclic prefix (CP) length and the like.

Further, the information, parameter and the like explained in the present Description may be expressed using an absolute value, may be expressed using a relative value from a predetermined value, or may be expressed using another corresponding information. For example, the radio resource may be indicated by a predetermined index. Furthermore, equations using these parameters and the like may be different from those explicitly disclosed in the present Description.

The names used in the parameter and the like in the present Description are not restrictive names in any respects. For example, it is possible to identify various channels (PUCCH (Physical Uplink Control Channel), PDCCH (Physical Downlink Control Channel) and the like) and information elements, by any suitable names, and therefore, various names assigned to these various channels and information elements are not restrictive names in any respects.

The information, signal and the like explained in the present Description may be represented by using any of various different techniques. For example, the data, order, command, information, signal, bit, symbol, chip and the like capable of being described over the entire above-mentioned explanation may be represented by voltage, current, electromagnetic wave, magnetic field or magnetic particle, optical field or photon, or any combination thereof.

Further, the information, signal and the like are capable of being output from a higher layer to a lower layer, and/or from the lower layer to the higher layer. The information, signal and the like may be input and output via a plurality of network nodes.

The input/output information, signal and the like may be stored in a particular place (e.g., memory), or may be managed using a management table. The input/output information, signal and the like are capable of being rewritten, updated or edited. The output information, signal and the like may be deleted. The input information, signal and the like may be transmitted to another apparatus.

Notification of the information is not limited to the Aspect/Embodiments described in the present Description, and may be performed using another method. For example, notification of the information may be performed using physical layer signaling (e.g., Downlink Control Information (DCI), Uplink Control Information (UCI)), higher layer signaling (e.g., RRC (Radio Resource Control) signaling, broadcast information (Master Information Block (MIB), System Information Block (SIB) and the like), MAC (Medium Access Control) signaling), other signals, or combination thereof.

In addition, the physical layer signaling may be called L1/L2 (Layer 1/Layer 2) control information (L1/L2 control signal), L1 control information (L1 control signal) and the like. Further, the RRC signaling may be called RRC message, and for example, may be RRC connection setup (RRC Connection Setup) message, RRC connection reconfiguration (RRC Connection Reconfiguration) message, and the like. Furthermore, for example, the MAC signaling may be notified using MAC Control Element (MAC CE).

Further, notification of predetermined information (e.g., notification of "being X") is not limited to notification that is performed explicitly, and may be performed implicitly (e.g., notification of the predetermined information is not performed, or by notification of different information).

The decision may be made with a value ("0" or "1") expressed by 1 bit, may be made with a Boolean value represented by true or false, or may be made by comparison with a numerical value (e.g., comparison with a predetermined value).

Irrespective of that the software is called software, firmware, middle-ware, micro-code, hardware descriptive term, or another name, the software should be interpreted widely to mean a command, command set, code, code segment, program code, program, sub-program, software module, application, software application, software package, routine, sub-routine, object, executable file, execution thread, procedure, function and the like.

Further, the software, command, information and the like may be transmitted and received via a transmission medium. For example, when the software is transmitted from a website, server or another remote source using wired techniques (coaxial cable, optical fiber cable, twisted pair, Digital Subscriber Line (DSL) and the like) and/or wireless techniques (infrared, microwave and the like), these wired techniques and/or wireless techniques are included in the definition of the transmission medium.

The terms of "system" and "network" used in the present Description are used interchangeably.

In the present Description, the terms of "Base Station (BS)", "radio base station", "eNB", "gNB", "cell", "sector", "cell group", "carrier" and "component carrier" are capable of being used interchangeably. There is the case where the base station is called by the terms of fixed station, NodeB, eNodeB (eNB), access point, transmission point, reception point, femto-cell, small cell and the like.

The base station is capable of accommodating one or a plurality of (e.g., three) cells (also called the sector). When the base station accommodates a plurality of cells, the entire coverage area of the base station is capable of being divided into a plurality of smaller areas, and each of the smaller areas is also capable of providing communication services by a base station sub-system (e.g., small base station (RRH: Remote Radio Head) for indoor use). The term of "cell" or "sector" refers to a part or the whole of coverage area of the base station and/or base station sub-system that performs communication services in the coverage.

In the present Description, the terms of "Mobile Station (MS)", "user terminal", "User Equipment (UE)", and "terminal" are capable of being used interchangeably. There is the case where the base station is called by the terms of fixed station, NodeB, eNodeB (eNB), access point, transmission point, reception point, femto-cell, small cell and the like.

There is the case where the Mobile Station may be called using a subscriber station, mobile unit, subscriber unit, wireless unit, remote unit, mobile device, wireless device, wireless communication device, remote device, mobile subscriber station, access terminal, mobile terminal, wireless terminal, remote terminal, handset, user agent, mobile client, client, or some other suitable terms, by a person skilled in the art.

Further, the radio base station in the present Description may be read with the user terminal. For example, each Aspect/Embodiment of the present invention may be applied to a configuration where communication between the radio base station and the user terminal is replaced with communication among a plurality of user terminals (D2D: Device-to-Device). In this case, the functions that the above-mentioned radio base station 10 has may be the configuration that the user terminal 20 has. Further, the words of "up", "down" and the like may be read with "side". For example, the uplink channel may be read with a side channel.

Similarly, the user terminal in the present Description may be read with the radio base station. In this case, the functions that the above-mentioned user terminal 20 has may be the configuration that the radio base station 10 has.

In the present Description, particular operation performed by the base station may be performed by an upper node thereof in some case. In a network comprised of one or a plurality of network nodes having the base station, it is obvious that various operations performed for communication with the terminal are capable of being performed by the base station, one or more network nodes (e.g., MME (Mobility Management Entity), S-GW (Serving-Gateway) and the like are considered, but the invention is not limited thereto) except the base station, or combination thereof.

Each Aspect/Embodiment explained in the present Description may be used alone, may be used in combination, or may be switched and used according to execution. Further, with respect to the processing procedure, sequence, flowchart and the like of each Aspect/Embodiment explained in the present Description, unless there is a contradiction, the order may be changed. For example, with respect to the methods explained in the present Description, elements of various steps are presented in illustrative order, and are not limited to the presented particular order.

Each Aspect/Embodiment explained in the present Description may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (Registered Trademark) (Global System for Mobile communications), CDMA 2000, UMB (Ultra Mobile Broadband), IEEE 802.11 (Wi-Fi (Registered Trademark)), IEEE 802.16 (WiMAX (Registered Trademark)), IEEE 802.20, UWB (Ultra-WideBand), Bluetooth (Registered Trademark), system using another proper radio communication method and/or the next-generation system extended based thereon.

The description of "based on" used in the present Description does not mean "based on only", unless otherwise specified. In other words, the description of "based on" means both of "based on only" and "based on at least".

Any references to elements using designations of "first", "second" and the like used in the present Description do not limit the amount or order of these elements overall. These designations are capable of being used in the present Description as the useful method to distinguish between two or more elements. Accordingly, references of first and second elements do not mean that only two elements are capable of being adopted, or that the first element should be prior to the second element in any manner.

There is the case where the term of "determining" used in the present Description includes various types of operation. For example, "determining" may be regarded as "determining" calculating, computing, processing, deriving, investigating, looking up (e.g., search in a table, database or another data structure), ascertaining and the like. Further, "determining" may be regarded as"determining" receiving (e.g., receiving information), transmitting (e.g., transmitting information), input, output, accessing (e.g., accessing data in memory) and the like. Furthermore, "determining" may be regarded as "determining" resolving, selecting, choosing, establishing, comparing and the like. In other words, "determining" may be regarded as "determining" some operation.

The terms of "connected" and "coupled" used in the present Description or any modifications thereof mean direct or indirect every connection or coupling among two or more elements, and are capable of including existence of one or more intermediate elements between two mutually "connected" or "coupled" elements. Coupling or connection between elements may be physical, may be logical or may be combination thereof. For example, "connection" may be read with "access". In the case of using in the present Description, it is possible to consider that two elements are mutually "connected" or "coupled", by using one or more electric wires, cable and/or print electric connection, and as some non-limited and non-inclusive examples, electromagnetic energy having wavelengths in a radio frequency region, microwave region and/or light (both visible and invisible) region, or the like.

In the present Description or the scope of the claims, in the case of using "including", "comprising" and modifications thereof, as in the term of "provided with", these terms are intended to be inclusive. Further, the term of "or" used in the present Description or the scope of the claims is intended to be not exclusive OR.

As described above, the present invention is described in detail, but it is obvious to a person skilled in the art that the invention is not limited to the Embodiments described in the present Description. The invention is capable of being carried into practice as modified and changed aspects without departing from the subject matter and scope of the invention defined by the descriptions of the scope of the claims. Accordingly, the descriptions of the present Description are intended for illustrative explanation, and do not have any restrictive meaning to the invention.

The disclosure of Japanese Patent Application No. 2016-215668, filed on Nov. 2, 2016, including the specification, drawings, and abstract, is incorporated herein by reference in its entirety.

The invention claimed is:

1. A terminal comprising:
   a processor that determines to use one of a first resource and a second resource for transmission when a first information is to be fed back as Hybrid Automatic Repeat reQuest (HARQ)-ACK information, and determines, based on a physical layer control information, whether to use the other of the first resource and the second resource for transmission or not to use either of the first resource and the second resource for transmission when a second information different from the first information is to be fed back as the HARQ-ACK information; and
   a transmitter that, when the one or the other of the first resource and the second resource has been determined to be used for transmission, transmits a signal with the one or the other resource that has been determined to be used for transmission.

2. The terminal according to claim 1, wherein the first information is a NACK and the second information is an ACK.

3. The terminal according to claim 1, wherein the first resource is a common resource with another terminal.

4. A radio communication method of a terminal, comprising:
   determining to use one of a first resource and a second resource for transmission when a first information is to be fed back as Hybrid Automatic Repeat reQuest (HARQ)-ACK information, and determining, based on a physical layer control information, whether to use the other of the first resource and the second resource for transmission or not to use either of the first resource and the second resource for transmission when a second information different from the first information is to be fed back as the HARQ-ACK information; and
   when the one or the other of the first resource and the second resource has been determined to be used for transmission, transmitting a signal with the one or the other resource that has been determined to be used for transmission.

5. A terminal comprising:
   a receiver that receives a signal with one of a first resource and a second resource, wherein when a first information is to be fed back as Hybrid Automatic Repeat reQuest (HARQ)-ACK information, one of the first resource and the second resource is used for transmission; and
   a transmitter that, when a second information different from the first information is to be fed back as the HARQ-ACK information, transmits a physical layer control information that is used to determine to whether to use the other of the first resource and the second resource for transmission or not to use either of the first resource and the second resource for transmission.

6. A system comprising a terminal and another terminal, wherein:
   the terminal comprises:
      a processor that determines to use one of a first resource and a second resource for transmission when a first information is to be fed back as Hybrid Automatic Repeat reQuest (HARQ)-ACK information, and determines, based on a physical layer control information, whether to use the other of the first resource and the second resource for transmission or not to use either of the first resource and the second resource for transmission when a second information different from the first information is to be fed back as the HARQ-ACK information; and
      a first transmitter that, when the one or the other of the first resource and the second resource has been determined to be used for transmission, transmits a signal with the one or the other resource that has been determined to be used for transmission; and
   the other terminal comprises:
      a second transmitter that transmits the physical layer control information to the terminal; and
      a receiver that receives the signal with the one or the other of the first resource and the second resource.

7. The terminal according to claim 2, wherein the first resource is a common resource with another terminal.

* * * * *